United States Patent [19]
Arimoto et al.

[11] Patent Number: 4,814,898
[45] Date of Patent: Mar. 21, 1989

[54] IMAGE SIGNAL PROCESSING SYSTEM

[75] Inventors: Shinobu Arimoto, Tokyo; Masanori Muramatsu, Yokohama, both of Japan

[73] Assignee: Canon Kabushiki Kaisha, Tokyo, Japan

[21] Appl. No.: 823,244

[22] Filed: Jan. 28, 1986

[30] Foreign Application Priority Data

Jan. 31, 1985 [JP] Japan .................................. 60-17007
Jan. 31, 1985 [JP] Japan .................................. 60-17008

[51] Int. Cl.$^4$ ............................................. H04M 1/40
[52] U.S. Cl. .................................. 358/260; 358/280; 358/293; 358/287
[58] Field of Search ................. 358/280, 293, 287, 71, 358/260; 382/49

[56] References Cited

U.S. PATENT DOCUMENTS

| | | | |
|---|---|---|---|
| 4,468,755 | 8/1984 | Iida | 358/287 |
| 4,591,904 | 5/1986 | Urabe et al. | 358/287 |
| 4,631,521 | 12/1986 | El-Sherbimi | 358/260 |
| 4,695,895 | 9/1987 | Nagashima | 358/287 |
| 4,731,672 | 3/1988 | Sugishima et al. | 358/296 |

FOREIGN PATENT DOCUMENTS 2101838 4/1982 United Kingdom .

OTHER PUBLICATIONS

Citation in an official action in connection with British counterpart of the present application.

Primary Examiner—Edward L. Coles, Sr.
Attorney, Agent, or Firm—Fitzpatrick, Cella, Harper & Scinto

[57] ABSTRACT

An image signal processing system processing system reads an image to obtain image signals, then compresses the image signals for storage, and expands the stored compressed signals for regenerating the original image. An efficient extraction of a part of image is achieved by means of an extraction signal, and the image expansion is terminated when the extraction of image is completed.

21 Claims, 33 Drawing Sheets

FIG. 8

| NAME | ABBREVIATION | DIRECTION | ROUGH CLASSIFICATION | CONTENTS |
|---|---|---|---|---|
| DEVICE CONNECT | $\overline{DCNCT}$ | R ← P | STATUS SIG | DEVICE (PRINTER) CONNECTED |
| BEAM DETECT | $\overline{BD}$ | R ← P | IMAGE SYNC SIG | HOR SYNC SIG OF IMAGE FROM PRINTER. NO NEED OF OUTPUT OF CD1 TO READER. |
| DEVICE POWER READY | DPRDY | R ← P | STATUS SIG | INDICATION THAT INITIALIZATION OF CPU OF DEVICE (PRINTER) AND PERIPHERY HAS BEEN COMPLETED, AND SERIAL COMMUNICATION IS AVAILABLE. |
| READY | $\overline{RDY}$ | R ← P | STATUS SIG | INDICATION THAT IMAGE FROM READER IS ABLE TO BE NORMALLY RECEIVED. NO ABNORMALITY. |
| VSYNC REQUEST | $\overline{VSREQ}$ | R ← P | SEQUENCE CONTROL | PAPER FEED COMPLETION. REGISTRATION AWAITING. |
| STATUS BUSY | $\overline{SBSY}$ | R ← P | SERIAL COMM | IN CONDITION OF OUTPUT OF SERIAL SIGNAL FROM PRINTER. |
| STATUS/COMMAND | $\overline{SC}$ | R ↔ P | SERIAL COMM | DUAL DIRECTION SERIAL CODE |
| SERIAL CLOCK | $\overline{SCLK}$ | R ↔ P | SERIAL COMM | DUAL DIRECTION SERIAL CLOCK |
| COMMAND BUSY | $\overline{CBSY}$ | R → P | SERIAL COMM | IN CONDITION OF OUTPUT OF SERIAL SIGNAL FROM READER. |
| PRINT | $\overline{PRNT}$ | R → P | SEQUENCE CONTROL | PAPER FEED COMMAND |
| VSYNC | $\overline{VSYNC}$ | R → P | SEQUENCE CONTROL (IMAGE SYNC SIG) | REGISTRATION COMMAND, AND OUTPUT OF IMAGE SIGNAL. |
| CONTROLLER POWER READY | CPRDY | R → P | STATUS SIG | INDICATION THAT INITIALIZATION OF CPU OF READER AND PERIPHERY HAS BEEN COMPLETED, AND SERIAL COMMUNICATION IS AVAILABLE. |
| VIDEO A | $\overline{VDA}$ | R → P | IMAGE SIG | VIDEO SIGNAL |
| VIDEO B | $\overline{VDB}$ | R → P | IMAGE SIG | VIDEO SIGNAL |
| VIDEO CLOCK | $\overline{VDCLK}$ | R → P | IMAGE SYNC SIG | VIDEO CLOCK |
| VIDEO ENABLE | $\overline{VE}$ | R → P | IMAGE SYNC SIG | ONE LINE IMAGE DISTINCTION SIGNAL. |
| PRINT REQUEST | $\overline{PREQ}$ | R ← P | SEQUENCE CONTROL | DRUM NORMAL ROTATION AND PAPER FEEDABLE. |

+

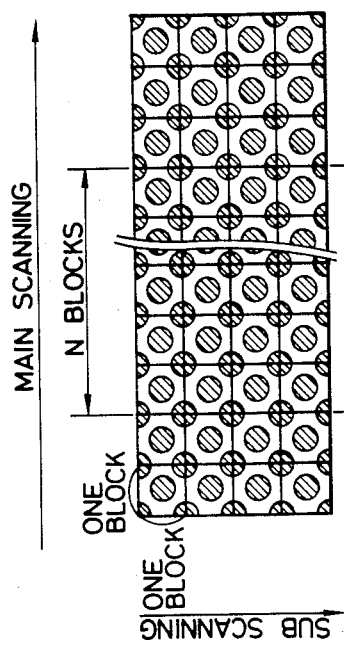
FIG. 16-1
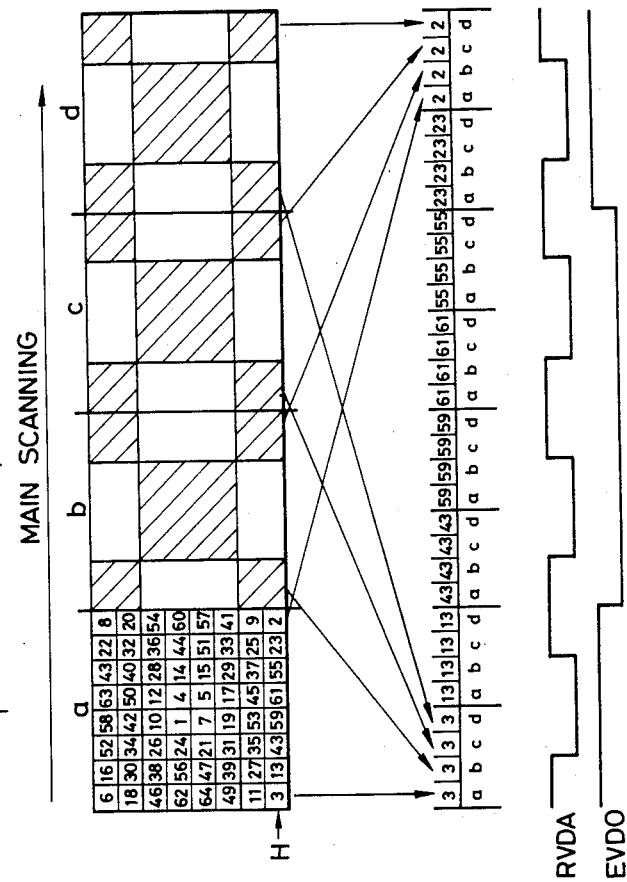
FIG. 16-2
FIG. 16-3
FIG. 16-4

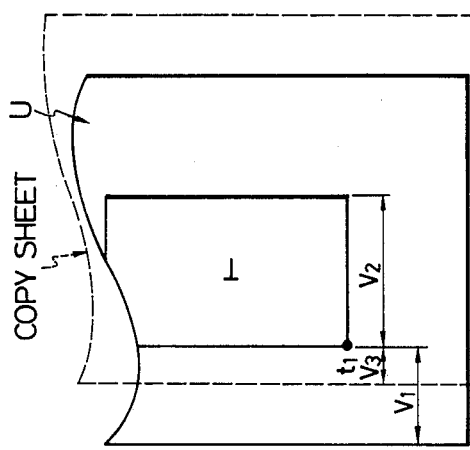
FIG. 22C
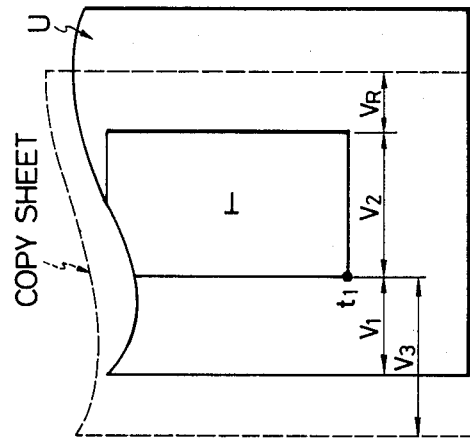
FIG. 22B
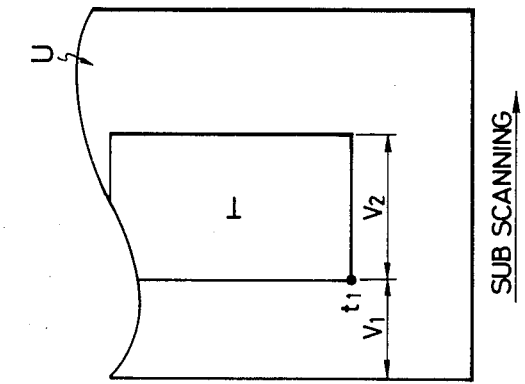
FIG. 22A

IMAGE SIGNAL PROCESSING SYSTEM

BACKGROUND OF THE INVENTION

1. Field of the Invention

The present invention relates to an image signal process system which processes an image in the form of electrical signals.

2. Description of the Prior Art

There are already proposed various image processings in which an image is converted into electrical signals for transmission, storage etc.

A binary representation of an A3-sized image with a resolving power of 400 dpi requires image signals of ca. 4 Mbytes, thus requiring a memory of the same capacity for the storage of said signals.

The use of image compression is therefore proposed. Such compression can generally reduce the amount of data of image to about 1/10, thus allowing the use of a relatively small memory.

In a case of extracting, for example for image formation, a part of the image represented by the compressed and stored image signals, such extraction is conducted after the compressed image signals are expanded. However such expansion requires complex operations which take a considerable time and may generate errors requiring certain error recovery processes. However, such error recovery process is wasteful if such error belongs to a part of the image not selected for extraction.

Also in case of moving the image represented by the compressed and stored image signals or forming a moved image by extracting a portion of said image, synchronization with an image forming apparatus is difficult to achieve.

Also, in a case of extracting a part of the input image signals for image formation or transmission, the compression of image signals corresponding to an unnecessary image area or the storage of such image signals is not only unnecessary but also gives rise to a higher probability of errors in compression, resulting from compression of such unnecessary image signals.

Also, it may be required to synthesize an image compressed and stored in the above-explained manner with another image for example for image formation, but exact registration of two images is difficult to achieve.

Also, in a case of an image formation by overlaying plural images through synthesis of plural image signals respectively representing different images, the synthesized image may show unpleasant local differences in image density, if the densities of the images to be synthesized, represented by respective electrical image signals, are significantly different. On the other hand, if plural images to be overlaid have the same density, one image may be masked by an other image. Also, it is not possible to independently regulate the densities of the images, for example for reproducing a background image with a low density and characters with a high density.

SUMMARY OF THE INVENTION

In consideration of the foregoing, an object of the present invention is to achieve an efficient image expanding operation, in case of extracting a part of the image represented by compressed image signals.

Another object of the present invention is, for example for the purpose of image movement, to expand and release necessary image signals with an adequate timing.

Still another object of the present invention is to avoid the compression of unnecessary image signals, for example in extracting a part of the image.

Still another object of the present invention is to enable synthesis of an image represented by compressed image signals stored in memory means and another image with exact registration.

Still another object of the present invention is to enable image synthesis with a desired density, through independent density regulation of plural image signals representing plural images to be synthesized.

The foregoing and still other objects of the present invention, and the advantages thereof, will become fully apparent from the following description.

BRIEF DESCRIPTION OF THE DRAWINGS

FIG. 8 is a chart showing various signals of the video interface;

FIGS. 16 (1–4) are schematic charts showing dither compression;

FIGS. 22(a), 22(b) and 22(c) are schematic views showing an image moving operation in the subscanning direction;

DETAILED DESCRIPTION OF THE PREFERRED EMBODIMENTS

Now the present invention will be clarified in detail by embodiments thereof shown in the attached drawings.

Figure 1:
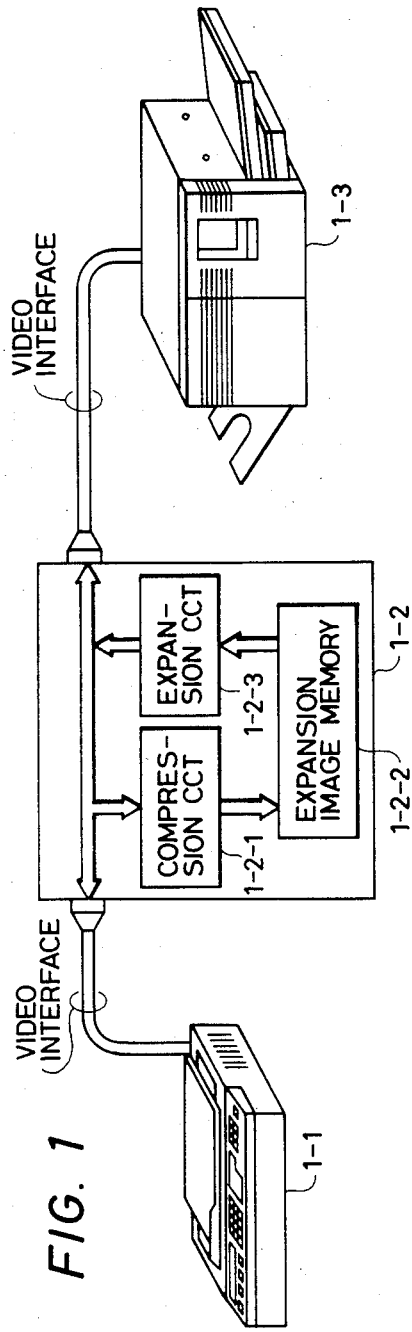
FIG. 1 is a schematic view showing the structure of an image processing system embodying the present invention.

FIG. 1 illustrates an image processing system embodying the present invention, composed of an image reading unit 1-1, hereinafter called reader; an image memory unit 1-2, hereinafter called RMU; and an image forming unit 1-3, hereinafter called printer.

The system principally performs a copy function in which image signals read in the reader 101 are formed into an image in the printer 1-3; a memory input function in which image signals read in the reader 1-1 are stored in the RMU 1-2; and a memory printout function in which the image signals stored in a memory of the RMU 1-2 are formed into an image in the printer 1-3.

These units are mutually connected through a video interface to be explained later.

Figure 2:
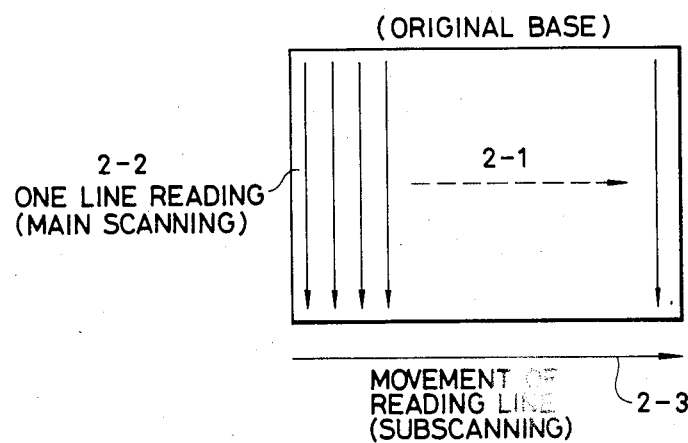
FIG. 2 is a schematic view showing an image reading operation with a reader.
Figure 3:
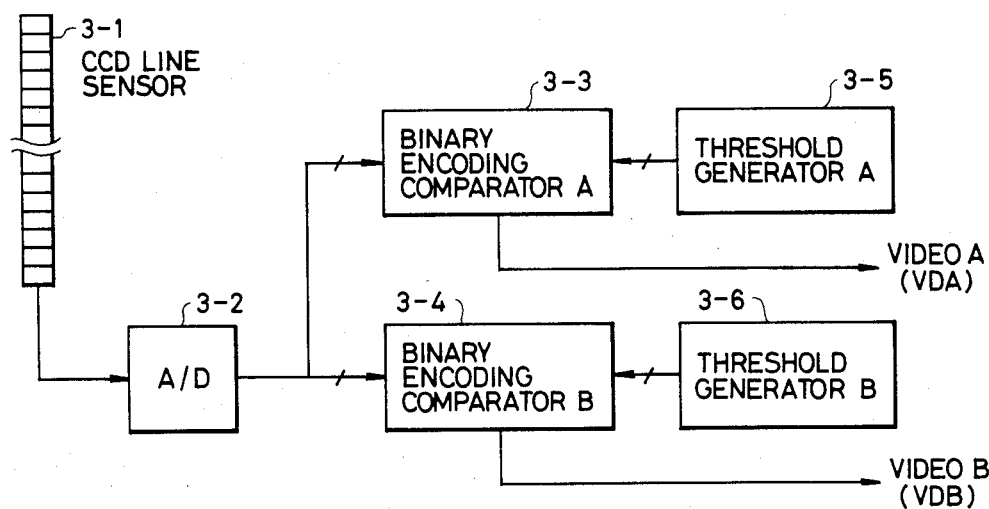
FIG. 3 is a block diagram showing the circuit structure of the reader.

The reader 1-1 reads, as shown in FIGS. 2 and 3, an original placed on an original base 2-1 with a linear CCD sensor 3-1 with photosensors of ca. 5,000 bits by decomposing said original image into lines of plural pixels, and releases bit-serial binary image signals VDA, VDB representing the density of the original image. In FIG. 2, the CCD 3-1 reads a line in a main scanning direction 2-2, and is moved in a sub-scanning direction 2-3 substantially perpendicular to said main scanning direction.

FIG. 3 schematically shows the structure of the reader, wherein the original on the original base 2-1 is illuminated by an unrepresented illuminating system, and the reflected light is converted by the linear CCD sensor 3-1 into bit-serial image signals of a main scanning line. The analog image signals, obtained from the CCD sensor 3-1, corresponding to the intensity of the reflected light, are digitized by an A/D converter 3-2 into digital image signals of plural bits per pixel, which are compared, in binary digitizing comparators 3-3, 3-4, with binary digitizing threshold signals generated by threshold generators 3-5, 3-6, to generate binary image signals VDA, VDB each represented by "1" or "0".

As an example, if the analog image signals are digitized by the A/D converter 3-2 into digital image signals of 6 bits, there are obtained 64 density levels from 0 to 63. If the threshold generators A (3-5) and B (3-6) provide threshold values of "42" and "21" respectively, the binary digitizing comparators 3-3, 3-4 provide binary image signals VDA, VDB in the following manner. In response to an output in a range of 0–20 from the A-D converter 3-2, there are obtained VDA=0 and DDB=0. Also in response to an output of 21–41, there are obtained VDA=0 and VDB=1, and in response to an output of 42–63 there are obtained VDA=1 and VDB=1. Thus, the image signal from the original is represented by VDA=0, VDB=0, or VDA=0, VDB=1, or VDA=1, VDB=1 according to the reflective density. In this manner the reader releases an image signal of three levels for each pixel. The threshold values of the threshold generators A, B may be selected mutually equal, in which case there is released an image signal of two levels. Also the threshold comparators 3-5, 3-6 may be employed to generate dither matrix threshold values according to an already known dither method, whereby an intermediate tone can be represented by ternary image signals VDA, VDB.

The image memory unit (RMU) 1-2 shown in FIG. 1 is composed of a compression circuit 1-2-1 for compressing the image signals from the reader by encoding, a compressed image memory 1-2-2 for storing thus encoded image signals, and an expansion circuit 1-2-3 for reading the compressed image signals from said memory 1-2-2 and expanding the same into bit-serial image signals by decoding.

Figure 4:
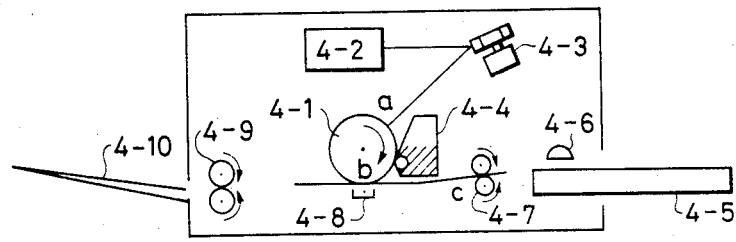
FIG. 4 is a schematic view of a printer.

The printer 1-3 is composed of an already known laser beam printer employing an electrophotographic process. As schematically shown in FIG. 4, there are provided a photosensitive drum 4-1 rotated about a shaft; a laser driver 4-2 for modulating a laser beam according to image signals; a polygonal scanner 4-3 for scanning the photosensitive drum 4-1 in the axial direction thereof with a laser beam emitted from said laser driver 4-3; a developing unit 4-4 for developing an electrostatic latent image, formed on the photosensitive drum 4-1 in response to the scanning with the laser beam, with toner; a print sheet cassette 4-5; a pickup roller 4-6 for picking up a print sheet from said cassette 4-5; a registration roller 4-7 for feeding the print sheet in synchronization with the rotation of the photosensitive drum 4-1; a transfer unit 4-8 for transferring the toner image, formed on the photosensitive drum 4-1, onto the print sheet; a fixing unit 4-9 for fixing thus transferred toner image onto the print sheet; and a sheet tray 4-10 on which a print sheet bearing the fixed toner image is discharged.

Figure 5:
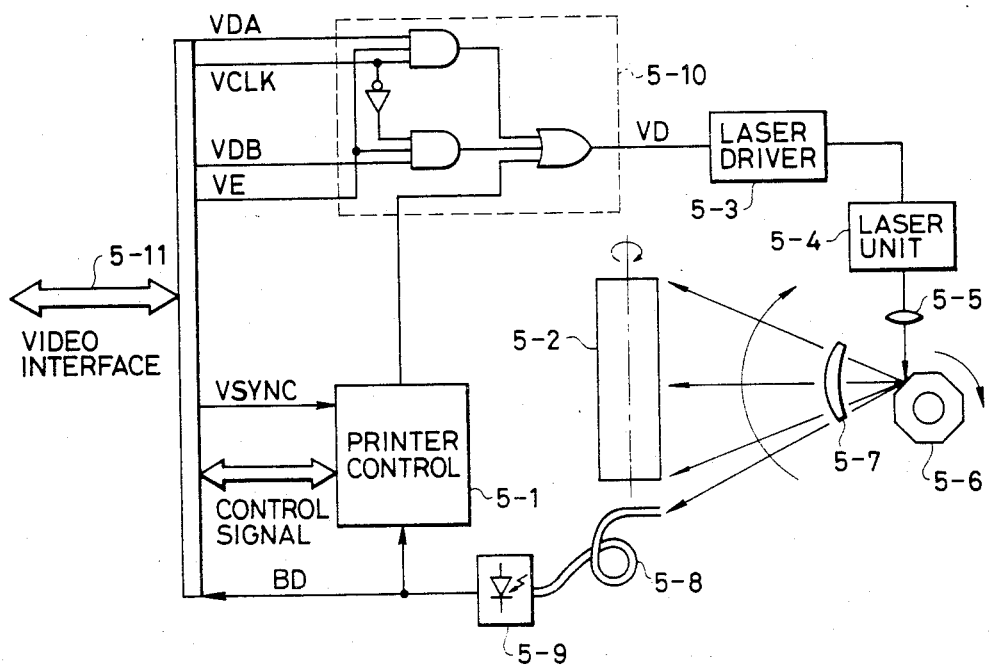
FIG. 5 is a block diagram showing the schematic structure of the printer.

Now reference is made to FIG. 5 for explaining the operation of the printer for printing the electrical image signals on a print sheet. Two binary image signals VDA, VDB supplied from a video interface 5-11 are synthesized into a ternary signal VD in a synthesizing circuit 5-10, then supplied to a laser driver 5-3 and converted into a corresponding laser beam in a semiconductor laser 5-4. Said laser beam is converged by a collimating lens 5-5, and is deflected by the polygonal mirror 5-6 to perform a scanning motion substantially parallel to the rotary axis of the photosensitive drum 5-2. Said beam is corrected in position by an f-$\theta$ lens 5-7 and irradiates the photosensitive drum 5-2 to form a latent image thereon corresponding to said signals VD.

The image formation in the printer is based on so-called electrostatic recording process, in which a charge on the photosensitive drum 5-2 is selectively dissipated by the laser beam and is then developed with developer into a visible image which is then transferred and fixed on the print sheet. There will not be given a detailed explanation since such electrostatic recording process is already known.

The laser beam deflected by the polygonal mirror 5-6 enters an optical fiber 5-8 prior to the irradiation of the photosensitive drum 5-2, and a photodetector 5-9 releases an electrical signal BD in response to such entry.

The latent image can be formed in an appropriate position on the photosensitive drum 2-2 if the image signal generating unit releases the signal VD after the lapse of a period, from said signal BD, required for the laser beam to reach the photosensitive drum 2-2.

Figure 6:
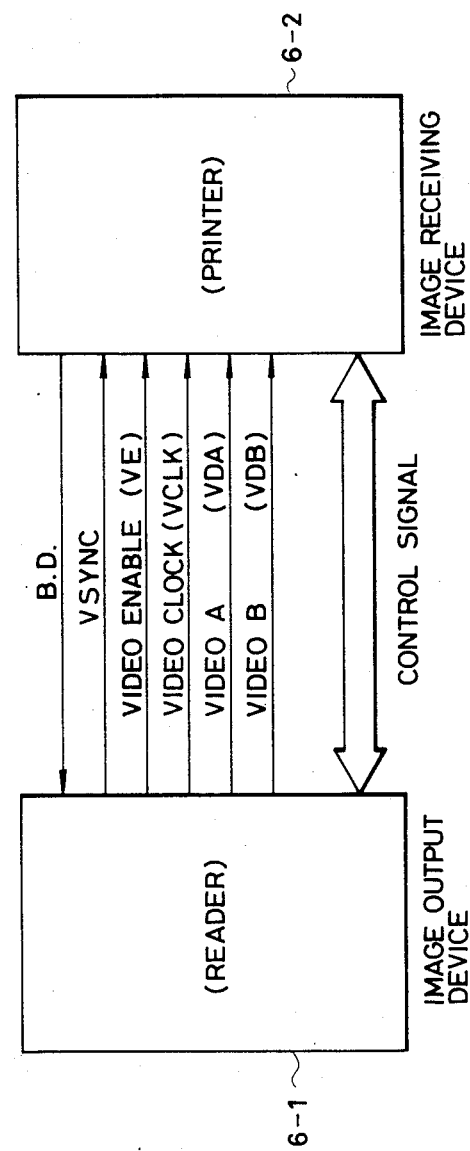
FIG. 6 is a schematic view showing an interface.

FIG. 6 schematically shows a video interface connecting the units shown in FIG. 1.

The video interface connects an image output unit 6-1, represented by the aforementioned reader, with an image receiving unit 6-2, represented by the printer. The image memory unit (RMU) 1-2 shown in FIG. 1 functions as an image receiving unit to the reader 1-1 and as an image output unit to the printer 1-3.

The video interface transmits not only the aforementioned bit-serial image signals VDA, VDB but a line synchronization signal BD from the image receiving unit for controlling the image signals, a page section signal VSYNC for the image signals from the image output unit, a video enable signal VE functioning as a line section signal, and an image clock signal VCLK.

Figure 7:
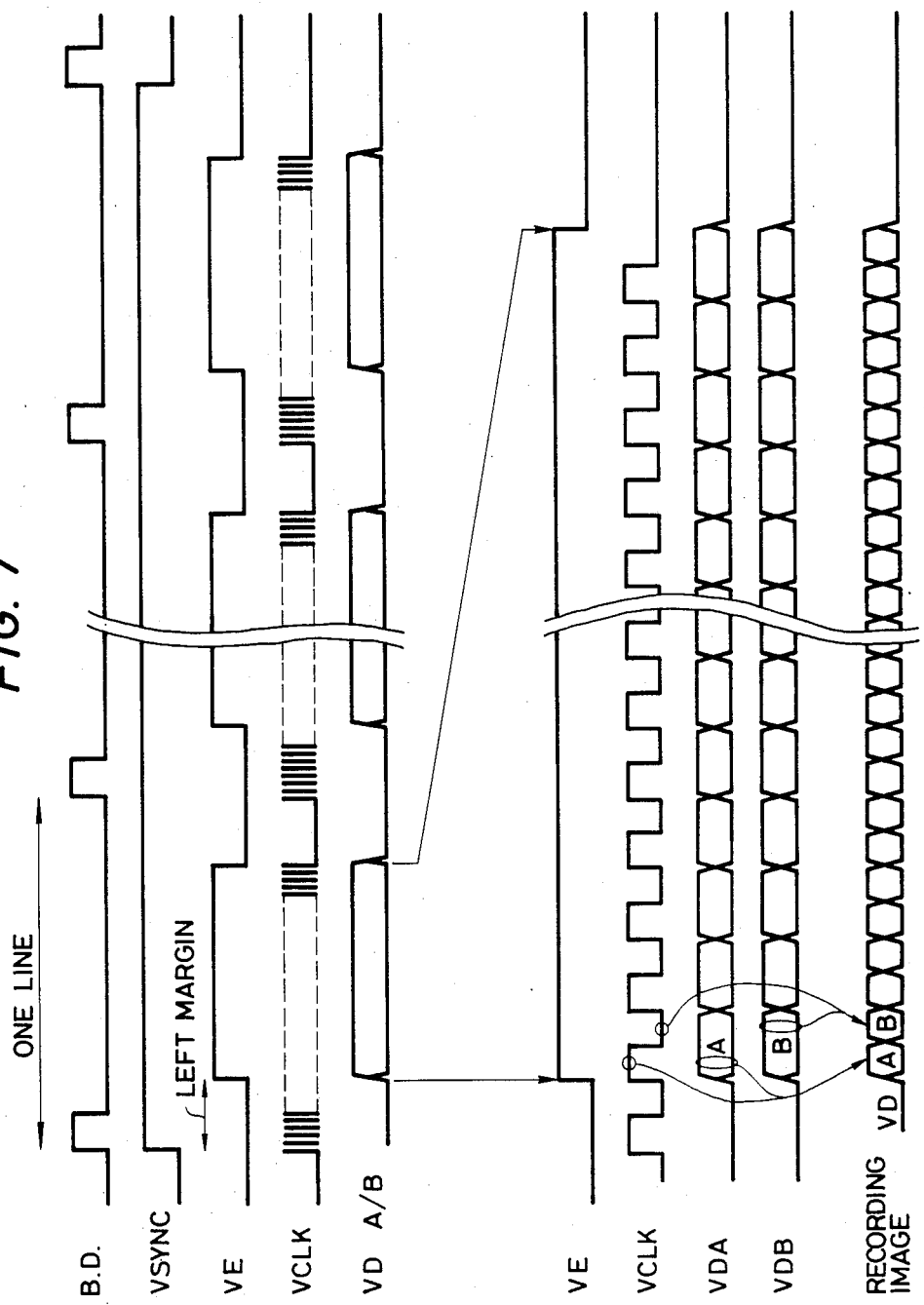
FIG. 7 is a chart showing the method of image signal transmission.

FIG. 7 shows the phase relationship of these image and synchronization signals. In response to the signal BD, the image output unit counts a left-margin period required for the beam to travel from the light-receiving end of the optical fiber 5-8 to the effective image area of the photosensitive drum 5-2 and then releases image signals VDA, VDB of a line and a section signal VE, which are synchronized with the image clock signal VLCK. In the printer the signals VDA and VDB are subjected to a ternary synthesis into an image recording signal VD in synchronization with the clock signal VCLK and transmitted to the laser driver.

In addition the video interface receives various control signal representing control information, including a connection signal DCNCT indicating the connection of various units; a power ready signal DPRDY indicating proper function of the control circuits of various units; a signal PREQ indicating the print sheet feeding enabled state of the image receiving unit; a sheet feed signal PRINT from the image output unit; an image request signal VSREQ from the image receiving unit; sheet size information of a sheet feeding station in the printer; connection status of various units and detailed error information.

FIG. 8 lists the name, abbreviation, direction, classification and content of the signals transmitted by the video interface.

The component units in the present embodiment have been explained in the foregoing. Now there will be explained the image encoding operation in the RMU 1-2.

The bit-serial image signals from the reader requires a memory capacity of 3.7M bytes for an A3-sized image, when read with a resolving power of 400 dpi (dots/in.). Since this capacity requires 574 units of 64K DRAM's (which are unrealistic in space requirements and cost), the image storage in the memory 1-2-2 is achieved by compression through encoding.

Figures 1, 9:
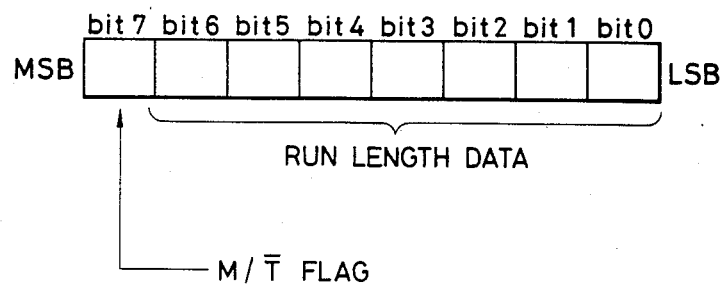
FIGS. 9 (1–5) are schematic views showing encoding operation.
Figures 2, 9:
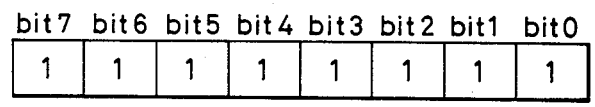
Figures 3, 9:
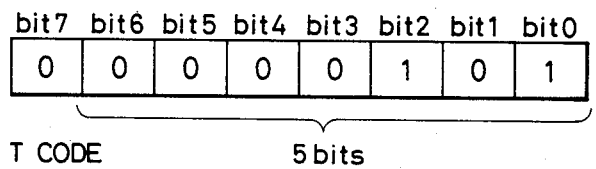
Figures 4, 9:
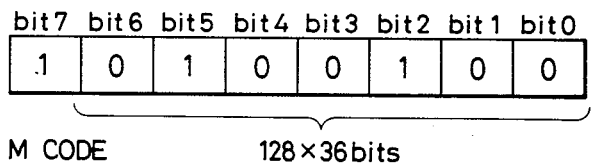
Figures 5, 9:
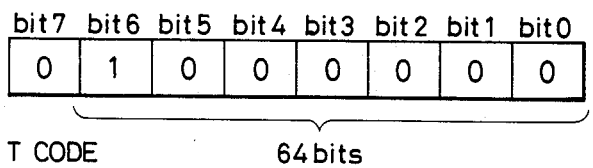

The image information from the reader is compressed in the image compression unit 1-2-2, achieved in the present embodiment by a run length encoding. In the run length method, the number of continuous signals "1" or "0" is counted, and the result of said counting is treated as an image signal. FIG. 9 shows the method of run length encoding employed in the present embodiment.

As shown in FIG. 9-1, the format of run length code in the present embodiment is composed of one byte or 8 bits, and the encoded data of image are represented by seven binary bits from bit 6 to bit 0. Since seven binary bits can only represent run lengths up to 127 bits, any run length exceeding 127 bits is represented by two bytes, in which case one of said two bytes is a make-up code (M-code) representing a run length of a multiple of 128 bits, while the other is a terminate code (T-code) indicating a remaining run length from 0 to 127 bits. For identifying said makeup code from terminate code, the bit 7 is used as an identification flag as shown in FIG. 9-1, wherein "1" and "0" respectively indicate an M code and a T code.

The run length encoding of the present embodiment is conducted in the following manner, in case, as an example, the image signals of 4677 bits, constituting a main scanning line of 297 mm in an A3-sized original, are composed of 5 continuous white bits and 4672 continuous black bits.

In said run length encoding, the initial while signals of 5 bits are encoded with a T-code as shown in FIG. 9-3. The succeeding black signals of 4672 bits are encoded with an M-code and a T-code. The M-code represents "36" in binary code as shown in FIG. 9-4, while the T-code represents "64 in binary code as shown in FIG. 9-5, so that 4672 is represented by 128×36 (M-code)+64 (T-code). Thus the image signals of 4677 bits, constituting a scanning line, are represented by three bytes shown in FIGS. 9-3, 9-4 and 9-5.

For making the end of a line there is employed an end-of-line (EOL) code shown in FIG. 9-2. Said EOL code resembles an M-code because the bit 7 is "1", but the signals "1" from bit 6 to bit 0 will represent, in case of an M-code, continuous image signals of 16256 bits. Since the maximum data length in a line in the present embodiment is equal to 4677 bits, the 6th bit in an M-code is always "0", so that signals "1" from 6th to 0th bits will not appear in the usual run length encoding. For this reason the EOL code can be clearly identified from the M-code.

Thus the image signals of a line, composed of white signals of 5 bits and black signals of 4672 bits can be stored in the memory by data of 4 bytes, including said EOL code, which are about 1/146 of the original signals. In this encoding method, data indicating white or black are not included in each code. Instead, it is assumed that the data of a line always start with a white code, and each T-code always indicates a change from white to black or from black to white. In case a line starts with a black signal, a T-code 0, indicating zero white signal, is inserted in the beginning. Also, even if continuous signals correspond to a multiple of 128 bits and can therefore be encoded with an M-code alone, a T-code 0 is attached for indicating the change of color.

Figure 10:
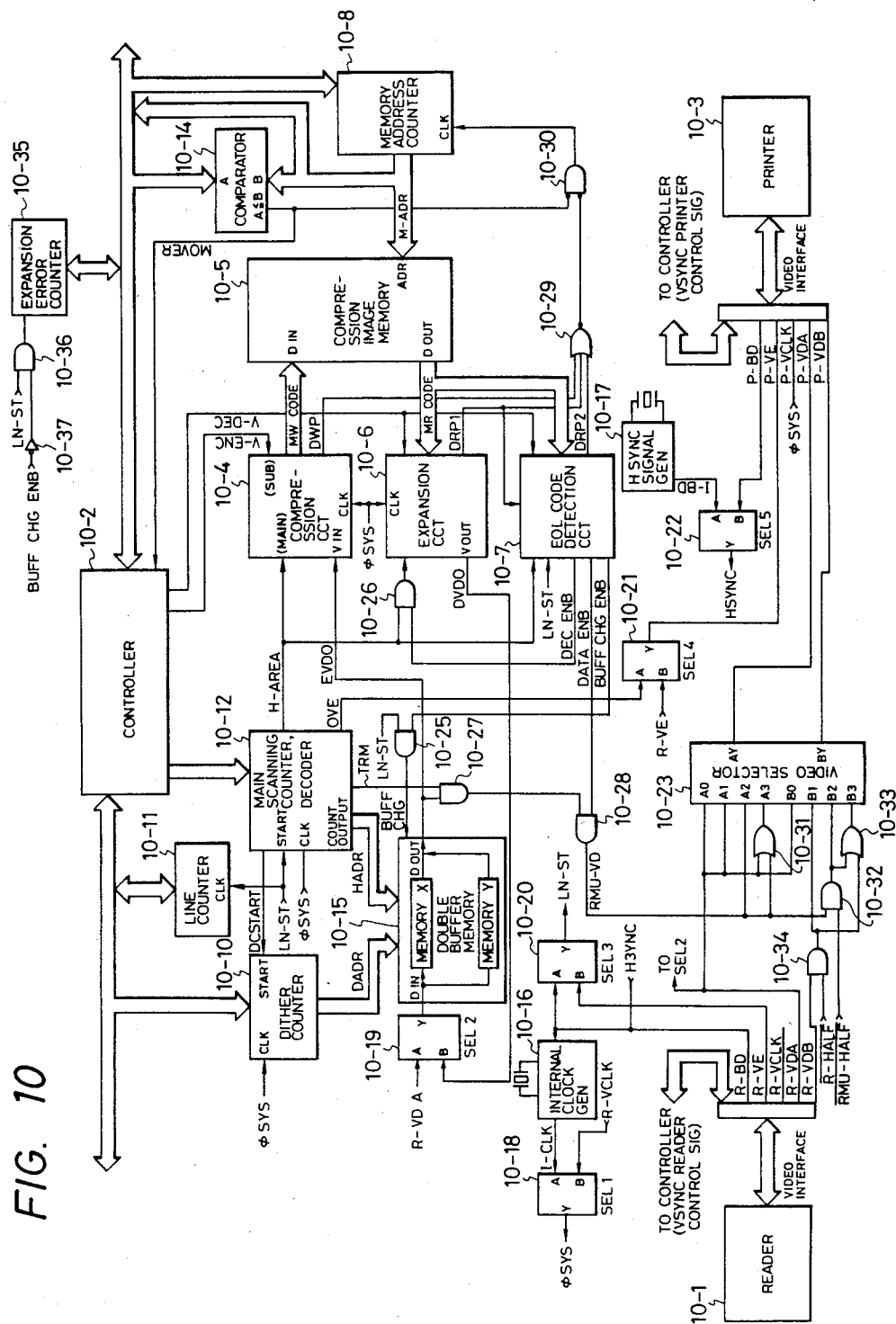
FIG. 10 is a block diagram showing detailed structure of MRU.

Now reference is made to FIG. 10 showing the details of the present embodiment, wherein a reader 10-1 corresponds to the reader 1-1 in FIG. 1, a printer 10-3 to the printer 1-3, a compression circuit 10-4 to 1-2-1, a compressed image memory 10-5 to 1-2-2, and an expansion circuit 10-6 to 1-2-3. A controller 10-2 is composed of a microprocessor and a peripheral I/O port device, and performs various functions such as serial communication with the reader 10-1 and printer 10-3, input and output of various control signals through the video interface, selector control in the RMU, setting of constants in the counters, comparators, etc., generation of timing signals, and fetching of the internal status of the RMU.

The compression circuit 10-4 compresses the image signals from the reader 10-1, one line at a time, by the aforementioned run length encoding.

The compressed image memory 10-5 stores the run length codes generated in the compression circuit 10-4, and supplied said codes to the expansion circuit 10-6.

The expansion circuit 10-6 expands the run length codes from the compressed image memory 10-5 into bit-serial image data.

An EOL code detecting circuit 10-7 detects an EOL error encountered in the expansion of the run length code, restores the EOL code and reduces the image in the sub scanning direction by skipping the EOL code at expansion. Said EOL detecting circuit functions only when a sub-scanning expanding section signal V-DEC from the controller 10-2 is asserted. When said signal VDEC is negated, a buffer change enable signal BUFF CHG ENB and a data enable signal DATA ENB released from said EOL detecting circuit 10-7 are fixed at a high (H) level, and a signal DRP2 is fixed at a low (L) level.

A memory address counter 10-8 for up-counting performs addressing of the compressed image memory 10-5. In said counter, a write-in/read-out start address can be set by the controller 10-2, and the output of said counter can be fetched by the controller 10-2. Said counter 10-8 receives signals DWP, DRP1 and DRP2, as count clock signals, from the compression circuit 10-4, expansion circuit 10-6 and EOL detecting circuit 10-7 through a NOR gate 10-29.

Figure 11:
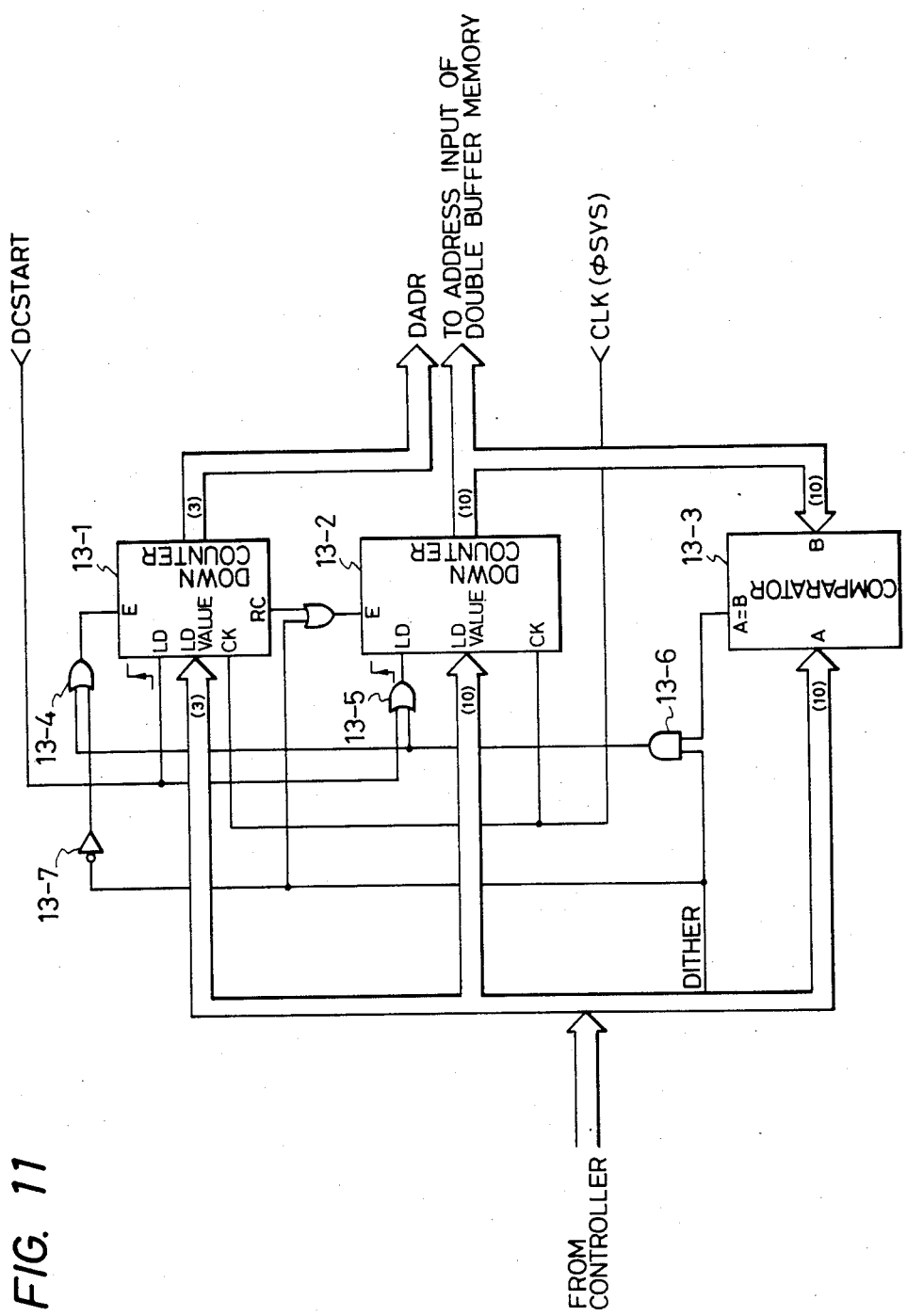
FIG. 11 is a block diagram showing the structure of a dither counter.

A dither counter 10-10 of a structure shown in FIG. 11 is composed of a 3-bit down counter 13-1, a 10-bit down counter 13-2, and a 10-bit comparator 13-3, wherein an address signal DADR of 13 bits in total, generated by the two down counters 13-1, 13-2 to a double buffer memory 10-15.

A line counter 10-11 counts the number of lines set by the controller 10-2, and supplies a signal thereto upon termination of the counting.

Figure 12:
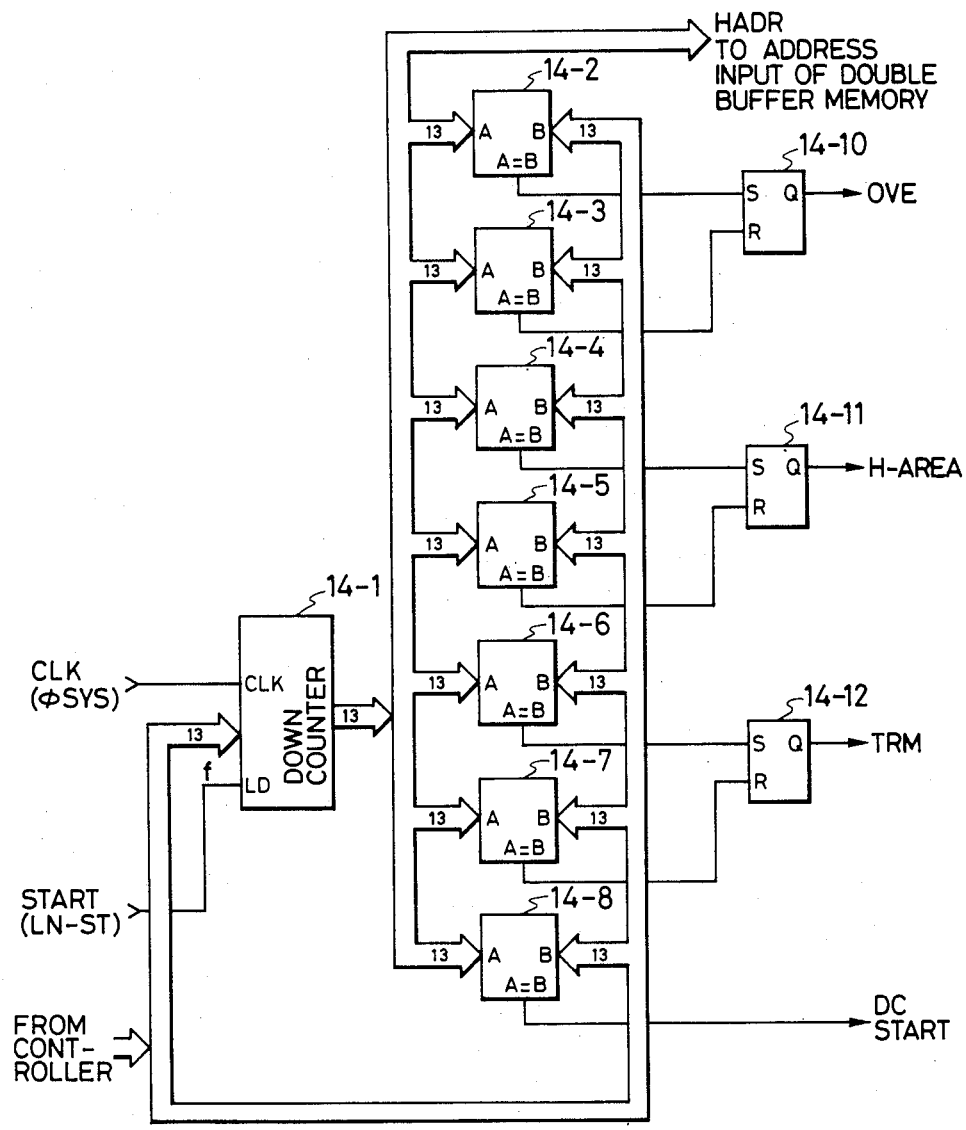
FIG. 12 is a block diagram showing the structure of a main scanning counter-decoder.

A main scanning counter/decoder 10-12 generates a compression/expansion section signal H-AREA for each line, a start signal SCSTART for the dither counter 10-10, an address signal HADR to the double buffer memory 10-15, and a signal TRM for trimming the image signals from said double buffer memory 10-15. FIG. 12 shows the details of said main scanning counter/decoder 10-12.

In FIG. 12, a 13-bit down counter 14-1 has a count start value set by the controller 10-2 and starts counting in response to a START signal. Each of 13-bit comparators 14-2 - 14-8 generates an output signal A=B when the value of the counter 14-1 becomes equal to a value respectively set by the controller 10-2. Flip-flops 14-10 - 14-12 are set and reset by the output signals of the comparators 14-2 - 14-7.

A comparator 10-14 compares an upcount output M-ADR of the memory address counter 10-8 with a value set by the controller 10-2. By an output signal MOVER of the comparator 10-14 indicating a state $A \leq B$, the controller 10-2 detects that the memory address counter 10-8 has reached the input value A of the comparator 10-14. Also the H-level state "1" of said signal MOVER causes a NOR gate 10-30 to prohibit the entry of clock signals CLK to the memory address counter 10-8, thus terminating the up-counting operation thereof.

The double buffer memory 10-15 is composed of memories X, Y of each one line, alternating the write-in and read-out operations. Said buffer memory is switched by the BUFF CHG signal, and a signal DADR from the dither counter 10-10 and a signal HADR from the main scanning counter/decoder 10-12 are suitably adopted as a read-address signal and a write address signal.

An internal clock generator 10-16 generates clock signals ICLK in synchronization with the HSYNC signal, for supplying the expanded image signals to the printer.

A horizontal synchronization signal generator 10-17 generates a signal IBD of a frequency substantially equal to that of the signal BD entered from the printer through the video interface. In case the signal P-BD defined by the video interface is not supplied from the printer 10-3, said IBD signal is selected by a selector SEL5 (10-22) and employed as the main scanning synchronization signal HSYNC in the RMU and the R-BD signal to the reader.

A selector 10-18 for clock signal $\phi_{sys}$ selects a video clock signal R-VCLK from the reader or a clock signal I-CLK from the internal clock generator 10-16 according to an instruction from the controller 10-2.

A selector 10-19 for data to be written in the double buffer memoby 10-15 selects image signals R-VDA from the reader or expanded image signals DVDO from the expansion circuit 10-6, according to an instruction from the controller 10-2.

A selector 10-20 for an LN-ST signal, employed as a count start signal of the main scanning counter-decoder 10-12 and a clock signal for the line counter 10-11 selects the HYSNC signal from a selector SEL5 10-22 or an R-VE signal from the reader, according to an instruction from the controller 10-2.

A selector 10-21 for a VE signal P-VE to the printer selects a corresponding signal OVE from the main scanning counter-decoder or the R-VE signal from the reader, according to an instruction from the controller 10-2.

The above-mentioned selector 10-22 for the HSYNC signal is also controlled by an instruction from the controller 10-2.

A selector 10-23 for image signals P-VDA and P-VDB to be supplied to the printer 10-3 is controlled by the controller 10-2. Input terminals A0, B0 of said video selector 10-23 receive the image signal R-VDA from the reader, and can be suitably selected to provide said image signal R-VDA from the reader as both of the image signals P-VDA and P-vDB to the printer, whereby the printer provides a binary image VD as will be apparent from FIG. 7.

On the other hand, when the video selector 10-23 selects the input terminals A1 and B1, the image signal R-VDA from the reader is supplied as the image signal P-VDA to the printer, and the image signal R-VDB from the reader is supplied, after passing an AND gate 10-34, as the image signal P-VDB to the printer. Said AND gate 10-34 receives another input signal $\overline{\text{R-HALF}}$ from the controller 10-2, and, if said input signal is at the H-level, the image signal P-VDB to the printer is same as the image signal R-VDB from the reader, so that the image VD from the printer corresponds to the synthesis of the image signals R-VDA and R-VDB from the reader, as shown in FIG. 7.

If said $\overline{\text{R-HALF}}$ signal is at the logic state "0" or "L" level, the image signal P-VDB to the printer is fixed to the L-level. Consequently, in the printer, as will be apparent from FIG. 7, there is recorded the image signal VDA having a duty ratio of ca. 50% for a pixel or a video clock period. This means that the continuation of the laser beam from the laser unit 5-4 in said L-level state is about a half of that in the H-level state, so that the output image density becomes about 50% of that obtainable from the image signal from the reader when said R-HALF signal is maintained at the L-level.

In case the video selector 10-23 selects the input terminals A2 and B2, the image signal P-VDA to the printer is the output RMU-VD from the double buffer memory 10-15 supplied through AND gates 10-27 and 10-28, while the image signal P-VDB to the printer is said signal RMU-VD supplied further through an AND gate 10-32. Said AND gate 10-32 receives another input signal $\overline{\text{RMU-HALF}}$ from the controller 10-2, and, if said input signal is at the H-level, the image signal P-VDB to the printer becomes identical with the image signal P-VDA, so that the printer provides a binary image VD according to said image signal RMU-VD as will be apparent from FIG. 7. If said signal $\overline{\text{RMR-HALF}}$ is at the L-level, the image signal P-VDB to the printer is fixed to the L-level. The signal P-VDA is same as the image signal RMU-VD from the double buffer memory 10-15 but the signal P-VDB is fixed at the L-level, so that the printer performs recording with an image signal of a duty ratio of ca. 50% for a pixel or a video clock period, as will be understood from FIG. 7. This means that the continuation of the alser beam from the laser unit 5-4 in the L-level state of the $\overline{\text{RMU-HALF}}$ signal is about a half of that in the H-level state, so that the output image density becomes about 50% by shifting the $\overline{\text{RMU-HALF}}$ signal to the L-level.

In case the video selector 10-23 selects the input terminals A3 and B3, the image signals P-VDA, P-VDB to the printer are synthesized from the image signals R-VDA, R-VDB and the image signal RMU-VD from the double buffer memory 10-15, through the function of OR gates 10-31, 10-32. Thus the printer can receive various image signals VD by arbitrary combinations of the aforementioned signals $\overline{\text{R-HALF}}$ and $\overline{\text{RMU-HALF}}$.

A two-input AND gate 10-25 controls the LN-ST signal by the BUFF CHG ENB signal from the EOL detecting circuit 10-7 for enabling double buffer exchange, thus generating a signal BUFF CHG for switching the reading and writing buffers of the double buffer 10-15.

An expansion error counter 10-35 counts the number of lines of expansion error caused by the expansion circuit 10-6.

The present embodiment, of the above-explained structure, has four principal functions as will be explained in the following:

(1) Binary Compression

In this function an arbitrary portion of the image signal R-VDA with a fixed threshold value from the reader 10-1 is binary compressed and stored in the compressed image memory 10-5. Storage of the image signal of an entire original into the memory 10-5 is an application of this function.

(2) Dither Compression

In this function an arbitrary portion of the image signal R-VDA with dither matrix thresholds from the reader 10-1 is dither compressed and stored in the compressed image memory 10-5.

(3) Binary Expansion

In this function the binary compressed image stored in the compressed image memory 10-5 is read, expanded in binary manner and supplied to the printer 10-3.

(4) Dither Expansion

In this function the dither compressed image stored in the compressed image memory 10-5 is read, expanded in a dither process and supplied to the printer 10-3.

These functions will be explained in more details in the following.

(1) Binary Compressing Function

The image signal from the reader is transmitted, with a VE signal representing a main scanning line as the synchronization signal, as shown in FIG. 7. A sub-scanning section of a page is represented by the VSYNC signal. In FIG. 10, said VE signal is represented as R-VE.

In the present embodiment the image compression is achieved by image data encoding in the main scanning direction but is not conducted in the subscanning direction.

Figure 13:
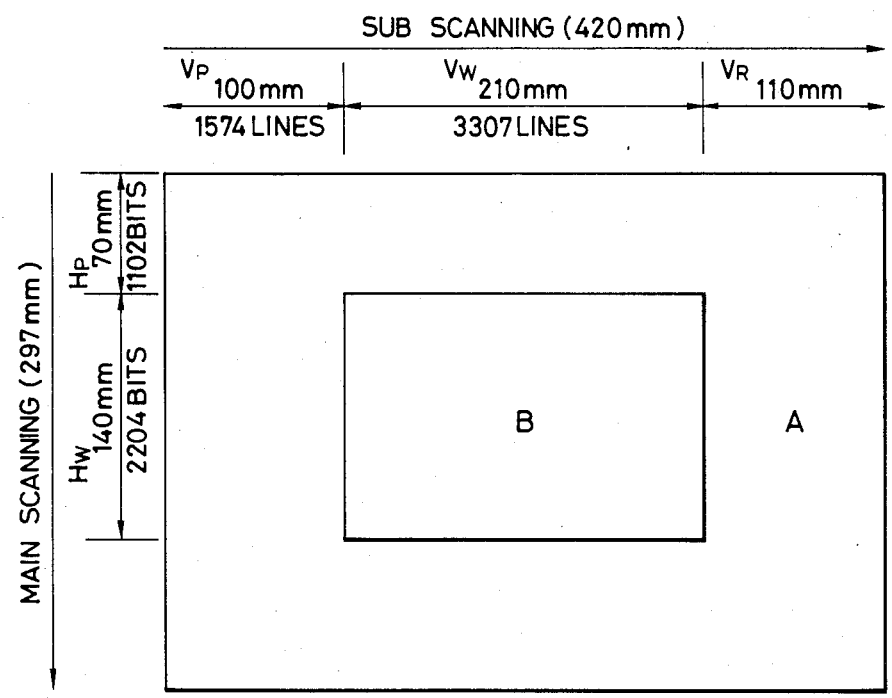
FIG. 13 is a schematic view showing a trimming state of an original image.

In the following there will be explained an example, in which information of an A3-sized image (a main scanning length of 297 corresponding to 4677 bits and a sub scanning length of 420 mm) with a resolving power of 400 dots/inch (dpi) supplied from the reader is trimmed, as shown in FIG. 13, to image information B of 140×210 mm, starting from a point of 70 mm in the main scanning direction and 100 mm in the subscanning direction and is then subjected to binary compression.

Prior to the reception of said image data from the reader 10-1, the controller 10-2 sets the operating modes in various units of RMU.

The selector SEL1 10-18 is set to select the clock R-VCLK from the reader 10-1, as the clock $\phi_{sys}$ to be employed in the RMU for compressing the image signal R-VDA from the reader 10-1.

The image signal R-VDA from the reader 10-1 is line by line stored in the double buffer 10-15, of which output is supplied to the compression circuit 10-4. Thus the selector SEL2 10-19 is so set that the double buffer 10-15 receives the image signal R-VDA.

The selector SEL3 10-20 for selecting the R-VE signal from the reader 10-1 as the line synchronization signal LN-ST. As already explained in relation to the video interface, the reader 10-1 requires the R-BD signal as a synchronization signal for generating the R-VE signal, and the selector SEL5 10-22 is set to release the IBD signal from the horizontal synchronization generator 10-17 as said R-BD signal.

Then a count start value of 4677 bits is set in the down-counter 14-1 of the main scanning counter-decoder 10-12 for handling image data of a line consisting of 4677 bits.

Also the main scanning direction in the area A shown in FIG. 13 is set in the compaprator 14-4, 14-5 of the main scanning counter-decoder 10-12. Thus the flip-flop 14-11, which is set and reset by the outputs of said two comparators, supplied an H-AREA signal to the compression circuit 10-4, and, during the H-level state of said signal, said compression circuit 10-4 compresses the image signal by run length encoding and stores the obtained signal into the compression image memory 10-5. For this purpose, in the comparator 14-4, there is set a value 3575, obtained by subtracting 1102 bits, corresponding to a margin of 70 mm to the area B in the main scanning direction in FIG. 13, from 4677 bits. Also in the comparator 14-5, there is set a value 1371, obtained by further subtracting 22·4 bits, corresponding to the main scanning width of 140 mm of the area B, from said value 3575.

The dither counter 10-10 is to be activated by an output SCSTART from the comparator 14-8. Thus, in said comparator 14-8, there is set a value 4677 in order to simultaneously activate the dither counter 10-10 with the down-counter 14-1.

Following constants are set in the dither counter 10-10. A count start value of 4677 is set in the counters 13-1, 13-2, and the dither signal is set to the L-level for binary compression. Thus the dither counter 10-10 functions in a similar manner as the down counter 14-1.

Through the above-explained constant settings, two addresses DARD, HADR given to the double buffer memory 10-15 are both counted down from 4677 at the start of the R-VE signal. Consequently an image signal EVDO supplied from the double buffer 10-15 to the compression circuit 10-4 is delayed, by a line, from the image signal R-VDA from the reader.

Since an expansion start signal V-DEC supplied to the expansion circuit 10-6 and the EOL detecting circuit 10-7 is at the L-level, signals DRP1 and DRP2 assume the L-level while the BUFF CHG ENG signal and the DATA ENB signal assume the H-level, whereby the compressing operation is not affected by the expansion circuit 10-6 and the EOL detecting circuit 10-7.

Also a write start address for the compressed image memory 10-5 is set in the memory address counter 10-8.

In this state the controller 10-2 awaits the entry of the VSYNC signal. In response to the entry thereof, the controller 10-2 sets a value of 1574 lines in the line counter 10-11, in order to measure a sub-scanning distance of 100 mm to the area B in FIG. 13. The line counter 10-11 is counted down in response to the LN-ST signal, and, upon entry of the main scanning section signal R-VE by 1574 times from the reader, the line counter 10-11 supplies a count-up signal to the controller 10-2, which thus discriminates that the image signal from the reader has entered the area B. In response the controller 10-2 shift the V-ENC signal from L-level to H-level to initiate the image compression in the compression circuit 10-4, and sets a value of 3307 in the line counter 10-11 for measuring a sub-scanning distance of 210 of the area B. Upon receiving a corresponding number of the R-VE signals, the line counter 10-11 again releases a count-up signal, and, in response the controller 10-2 shifts the V-ENC signal to L-level, thus terminating the image signal compression of the compression circuit 10-4.

In this manner the image signal R-VDA continuously supplied from the reader 10-1 is trimmed, in the main scanning direction, to a period of H-level of the H-AREA signal from the main scanning counter-decoder 10-12 and, in the sub scanning direction, to a period of H-level of the V-ENC signal supplied from the controller 10-2, and simultaneously encoded by the compression circuit 10-4 and stored in the compressed image memory 10-5.

Figure 14:
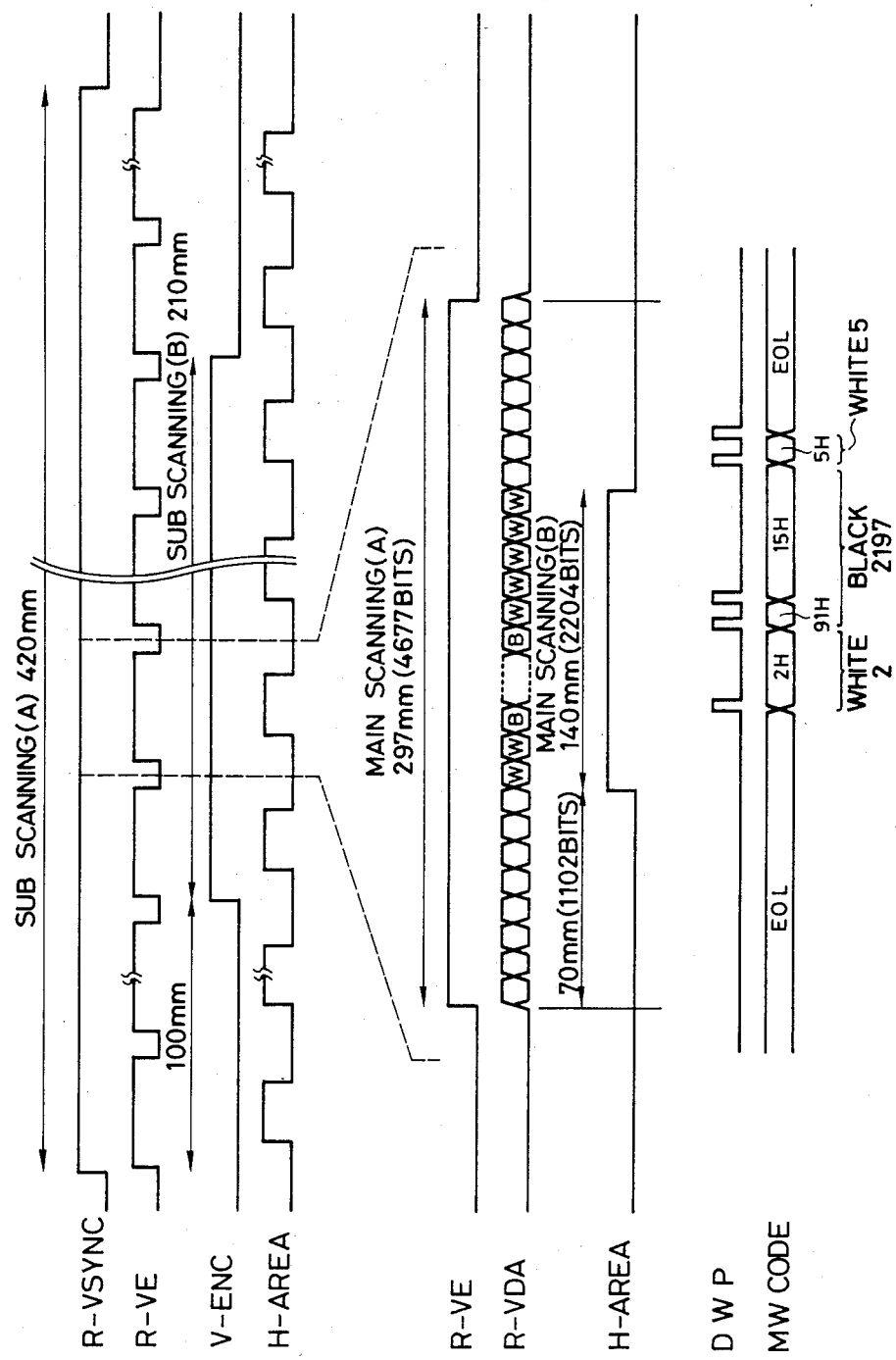
FIG. 14 is a timing chart showing compressing operation for image signals.

FIG. 14 shows the status of the above-explained operation, in which the image signal R-VDA, representing a line, consists of a white signal of 2 bits, a black signal of 2204 bits and a white signal of 5 bits in a trimming area of said line. In response the compression circuit 10-4 generates run length codes of 5 bytes, i.e. a T-code 2H corresponding to the first 2 white bits, then an M-code 91H and a T-code 15H corresponding to 2204 black bits, a T-code 5H corresponding to final 5 white bits and an EOL code in response to the termination of the H-AREA signal, which are stored in the compression image memory 10-5 in response to a write-demand pulse DWP from the compression circuit 10-4.

The memory address counter 10-8, for addressing the compressed image memory 10-5, undergoes an increment in response to said pulse DWP supplied through gates 10-29, 10-30.

Figure 15B:
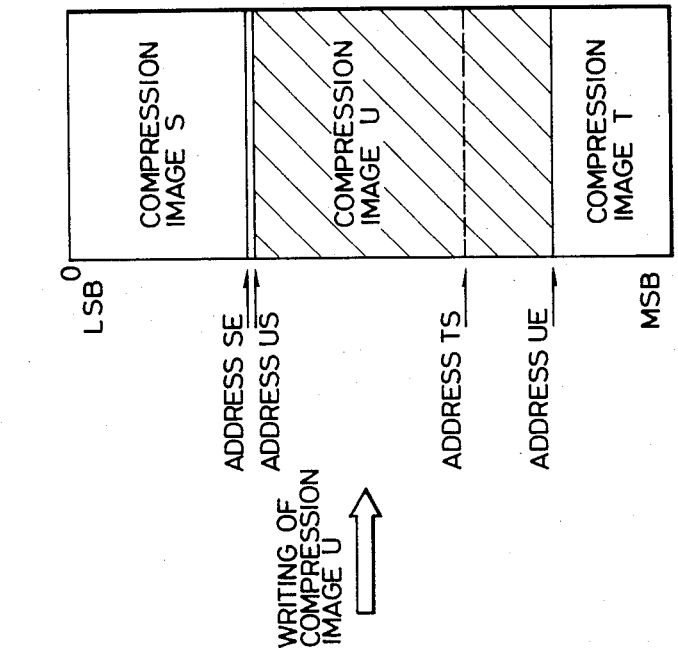
FIGS. 15 A–B are schematic charts showing the memory state.
Figure 15A:
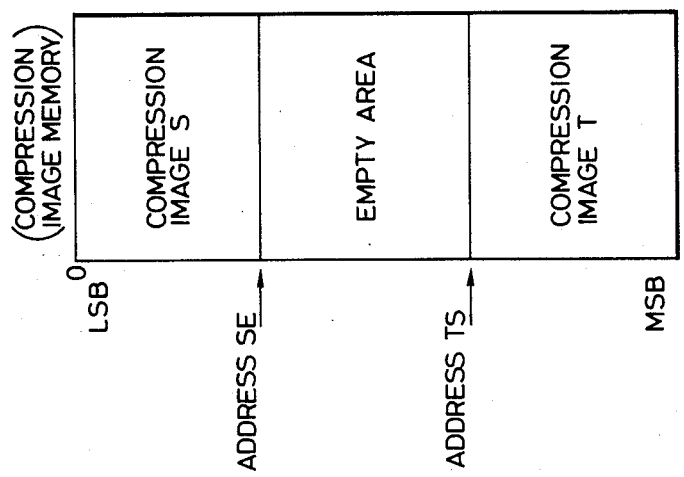

If the image signal R-VDA from the reader shows frequent changes, the compressed image memory 10-5 may not be able to accommodate all the resulting compression codes MW. Also in case of compressed image data of plural pages in the memory 10-5 as shown in FIG. 15, a part of the already stored compressed image data T may be destroyed by newly stored image data U. In the present embodiment the comparator 10-14 is employed to monitor the status of the memory, detecting that the data have exceeded the available memory area and protecting other compressed data.

FIG. 15 shows an example of storing a compressed image U, into the compressed image memory in which a compressed image S with an end address SE and a compressed image T with a start address TS are already stored, between the addresses SE and TS. The controller 10-2 sets a write start address US in the memory address counter 10-8 according to the end address SE of the compressed image S, and sets the start address TS of the compressed image T as an address limiter in the comparator 10-14. When the count of the address counter 10-8 in the course of writing reaches the value TS of the comparator 10-14, the comparator generates an output A≦B, whereby the gate 10-30 intercepts new write demand pulses DWP, so that the memory address counter is stopped and new data writing operation is prohibited. The compressed image T is protected in this manner. In response to the MOVER signal, indicating A≦B, from the comparator 10-14, the controller 10-2 identifies that the compressed image cannot be stored in the memory 10-5, thus identifying an image compression error, designating said memory area from SE to TS as empty, prohibiting the output of said image data that cannot be accomodated and displaying a notice on a display unit of the reader.

At the completion of image compressoin, the controller 10-2 checks the MOVER signal, and, in the absence thereof, identifies a successful compression and storage of image. Thus it fetches the address output MADR from the memory address counter 10-8 and stores the same as the end address of the compressed image which has just been stored, in an internal memory of the controller for use in the selection of the start address in the next writing of a compressed image.

Also the controller retains the start and end addresses set in the memory address counter 10-8, for use in the expansion of the compressed image.

In case of encoding and storing the image of the entire original, the trimming area is selected equal to the original size.

(2) Dither Compressing Function

In case the image signal from the reader 10-1 involves intermediate tone by systematic dither process, the change in image becomes more frequent so that effective image compression becomes difficult to achieve with the encoding of continuity of image in the main scanning direction, as employed in the present embodiment.

Therefore, in the present embodiment, a dither-processed image signal is effectively compressed by the periodicity of the dither pattern.

A dither-processed image signal is supplied, from the reader 10-1, with repeating patterns of black and white images as shown by (16-1) in FIG. 16. The dither process in the present embodiment employs an 8×8 dither matrix of which details is shown in a block a in (16-2). If the image signal read in the reader 10-1 has a uniform value of 32nd level, black signals are released where the threshold value of the dither matrix exceeds 32 to obtain an image signal schematically shown in (16-1) by means of the dither matrix shown in (16-2). Four blocks in the main scanning direction of the image signal (16-1) are enlarged in (16-2). The signal of a main scanning line H provides a signal R-VDA shown in (16-4), involving 8 state changes in 4 blocks. The number of said state changes is proportional to the number of blocks. Thus, for the width of A4-size (297 mm) there will result 1168 state changes, giving rise to 1170 bytes in run-length encoding, which are about twice of the original amount of data of 4677 bits.

Thus, in the image signals of the line H those processed with a same threshold value are extracted and rearranged in the order of blocks as shown in (16-3). As shown by EVDO in (16-4), the rearranged image signals show two state changes in four blocks. Since the signals processed with a same threshold value in the consecutive blocks show relatively limited changes, said rearrangement can extend the continuity of the image.

In the present embodiment, said rearrangement of the image signals according to the dither matrixes is achieved by controlling the signal read-out from the double buffer memory 10-15 by means of the dither counter 10-10.

The dither image signals R-VDA from the reader are stored in the double buffer memory 10-15 in the order of input by the address control of the main scanning counter-decoder 10-12.

Since the present embodiment employs an 8×8 dither matrix which repeats the pattern at an interval of 8 bits in the main scanning direction, the dither counter 10-10 controls the signal readout from the double buffer memory 10-15 at an interval of 8 bits. Said signal readout at an 8-bit interval is effected by a dither signal from the controller 10-2 shown in FIG. 11. Also the controller 10-2 sets, in the comparator 13-3, a value obtained by subtracting N-1 from the number set in the counter 13-2, wherein N is the number of blocks in the main scanning direction shown in (16-1). Said number N of blocks corresponds to the length of the H-AREA signal indicating the length of compressed data in the main scanning direction given to the compression circuit 10-4, wherein the number of bits of said H-AREA signal is equal to N×8. Thus the number N of blocks varies if the length of the H-AREA signal varies according to the original image size or, in case of an image trimming, the size of trimming area.

Upon a shift of the dither signal, shown in FIG. 11, to the H-level, the 10-bit counter 13-2 is separated from the 3-bit counter 13-1 and performs a downward counting. Upon counting the number N of blocks set in the comparator 13-3, there is generated an output A=B to load the initial value again in the counter 13-2 and to subtract "1" from the counter 13-1.

More specifically the counter 13-2 counts the blocks N and the counter 13-1 designates the threshold value in each block. Also the comparator 13-3 can select an arbitrary number N according to the length of dither matrix in the main scanning direction, and in this manner it is possible to deal with dither compression of image signals having an arbitrary length in the main scanning direction.

(3) Binary Image Expanding Function

In this function, the binary compressed image, explained in (1) is expanded and supplied to the printer 10-3, and the expanded image can be trimmed or moved.

For explaining basic binary image expansion, without image movement or trimming, there will be given an example in which compressed image signals obtained by binary image compression from the area B in FIG. 13 are stored in the compressed image memory 10-5 and are reproduced in the area B of an A3-sized print sheet corresponding to the area A.

Prior to the output of the expanded image in the area B, the controller 10-2 causes the printer 10-3 to feed an A3-sized print sheet in advance, in order to form a margin of 100 mm in the sub-scanning direction. As shown in FIG. 4, the printer is constructed in such a manner that the distance from an image transfer position b of a photosensitive drum to a position a of laser exposure thereon is same as the distance from said position b to a position c of sheet registration. Thus the image expanding operation of the image B is started after an A3-sized print sheet is advanced by 100 mm in the sub-scanning direction by a registration roller 4-7. For this purpose the controller 10-2 supplies a registration sheet feed signal VSYNC to the printer, and then sets a number of lines corresponding to 100 mm in the line counter 10-11. Said number is equal to 1574 lines in case of a resolution of 400 dpi.

At the image expansion, the selectors SEL3 (10-20) and SEL 5 (10-22) select a BD signal P-BD from the printer as the line synchronization signal LN-ST. Also the selector SEL1 (10-18) selects the clock signal I-CLK generated by the interval clock genrerator 10-16 in synchronization with the HSYNC signal selected by the selector SEL5 (10-22) as the interval clock $\phi_{sys}$.

When the line counter 10-11 has counted 1574 lines corresponding to a margin of 100 mm in the sub-scanning direction, the controller releases an image expansion signal V-DEC to initiate the image expansion in the area B. Prior to this operation the controller sets the address at the image compression in the memory address counter 10-8, and the final MADR value at the image compression in the comparator 10-14.

In response to the VDEC signal from the controller 10-2, the expansion circuit 10-6 expands the image line by line, and the expanded image signals DVDO are stored in the double buffer 10-15, and are supplied to the printer with a delay of a line. In this operation the dither counter 10-10 functions as a write address counter for the double buffer memory 10-15, and the main scanning counter-decoder functions as a read address counter.

Figure 17:
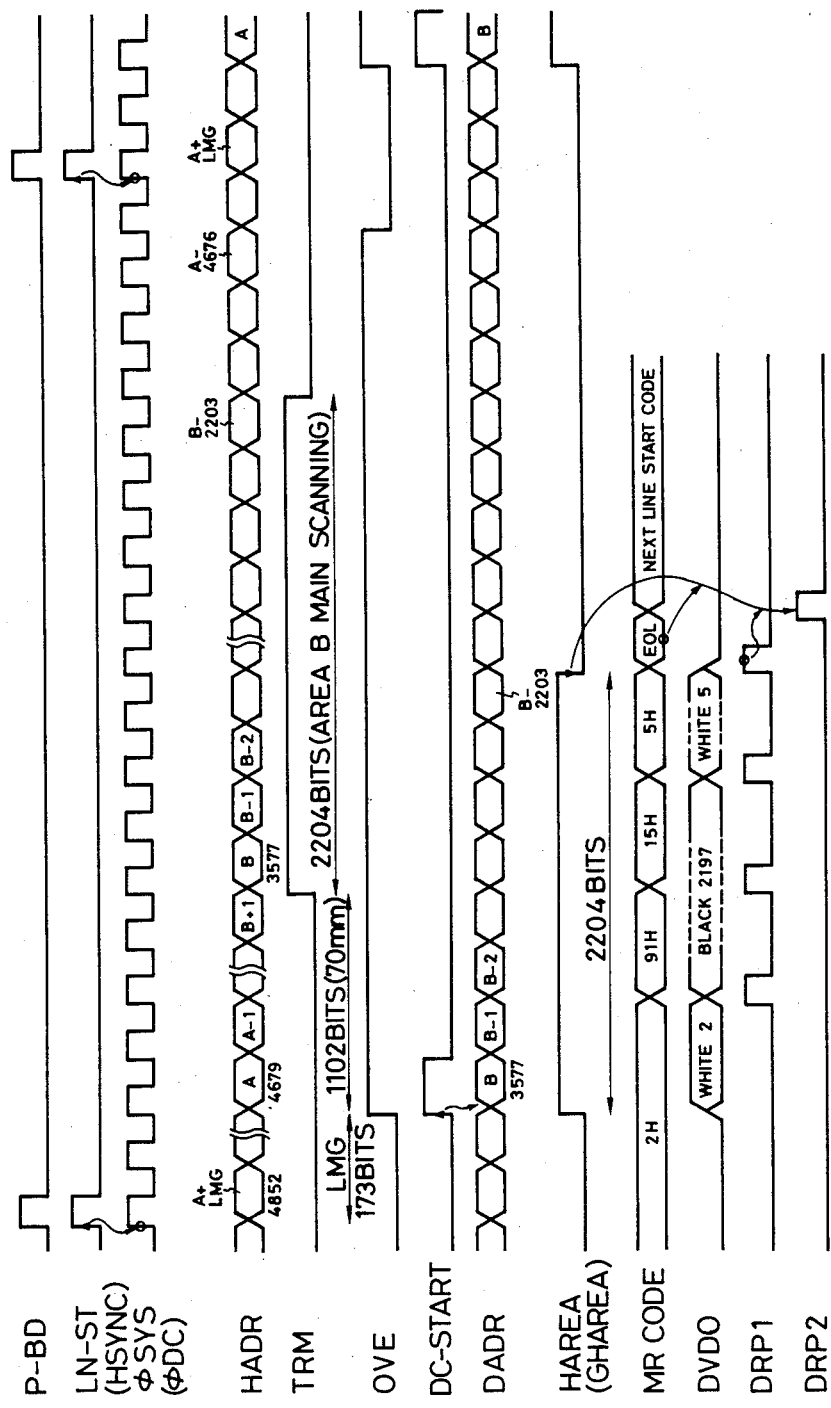
FIG. 17 is a timing chart showing an expanding operation for image signals.

Now reference is made to FIG. 17 for explaining the image expanding operation of a line. It is assumed that an OVE signal, functioning as a video enable signal for the printer, is shifted to the H-level when the value of HADR becomes A. Thus, in the down counter 14-1 of the main scanning counter-decoder 10-11, there is set a value A+LMG, wherein said LMG is a value, 173 bits, corresponding to the aforementioned left-side margin. Also said value A is set in the comparator 14-2. Furthermore there are set a number A-4676 in the comparator 14-3, a number A in the comparator 14-4, a number A-2203 in the comparator 14-5, a number B in the comparator 14-6, a number B-2203 in the comparator 14-7, and the number A in the comparator 14-8 in order to activate the dither counters 13-1, 13-2 when the counter 14-1 reaches said number A. Also said number A is loaded in said dither counters 13-1, 13-2 for conducting a counting operation the same as in the counter 14-1.

In response to the P-BD signal from the printer 10-3, there is generated the LN-ST signal, whereby the HADR of the main scanning counter-decoder counts the clock signals downward from A+LMG, and upon reaching the number A there are generated signals OVE, HAREA and SCSTART. Said LMG is a number of clock signals corresponding to the main scanning length from the sensor BD of the printer to the effective image area of the photosensitive drum, and the image signals supplied to the printer during the H-level state of the OVE signal are printed on a print sheet.

When the HADR reaches the value B by counting 1102 clock pulses, corresponding to a margin of 70 mm in front of the area B in FIG. 13, after reaching said value A, a signal TRM is shifted to the H-level whereby the gate 10-27 transmits the image signals from the double buffer memory. When 2204 pixels are supplied to the printer corresponding to a main scanning width of 140 mm of the area B, the HADR reaches the value B - 2203 to shift the TRM signal to the L-level, whereby the ensuing image signals are cancelled by the gate 10-27. The supply of the expanded image signals from the double buffer memory to the printer is conducted in the above-explained manner. Then, the storage of the expanded image DVDO into said double buffer memory 10-15 is conducted in the following manner.

Simultaneously with the start of the OVE signal, the H-AREA signal supplied to the expansion circuit 10-6 and EOL detecting circuit 10-7 is shifted to the H-level, thus initiating the expansion of the compressed image codes MR in said expansion circuit 10-6. During the H-level state of the sub-scanning expanding section signal V-DEC and the main scanning expanding section signal H-AREA, the expansion circuit 10-6 reads the compressed image codes MR from the compressed image memory 10-5, fetches said codes in an unrepresented decoding counter and generates the expanded image signals DVDO in synchronization with the clock signals $\phi_{sys}$. As shown in FIG. 17, the T-code 2H is at first fetched to generate a white signals DVDO corresponding to two clock pulses $\phi_{sys}$. The decoding counter generates a compressed image demand signal DRP1 after said two clock pulses to fetch a succeeding MR code from the compressed image memory 10-5 and invert the output signal DVDO.

In response to a succeeding M-code 91H, 2176 clock signals $\phi_{sys}$ are counted and the signal DRP1 is generated. The signal DVDO is not inverted in response to said M-code but in response to a succeeding T-code 15H. The image expansion is conducted in this manner during the H-level state of the H-AREA signal and the expanded image signals DVDO are stored in the double buffer memory 10-15 according to the DADR of the dither counter 10-10. The count start value of the dither counter is set at B in order that said DVDO signals are read, in the next line, from an address B of the HADR. Also the dither counter shown in FIG. 11 is set at an L-level dither signal for binary expansion.

The comparators 14-4, 14-5 are so set that the length of the H-AREA signal at the image expansion becomes same as that of the H-AREA signal at the image compression of the area B, and, at the end of said H-AREA signal, the EOL detecting circuit 10-7 discriminates the success of the image expansion.

The success of the image expansion is identified from the presence of following three states that the H-AREA signal has been terminated, that an EOL code is immediately following, and that the decoding counter of the expansion circuit 10-6 is in a count-up state to generate the DRP1 signal. This discrimination is effected because an error may be included in the code at the storage of the codes MW from the compression circuit into the compressed image memory 10-5 or at the read-out of the codes MR from said memory, and the end of the external section signal H-AREA, the generation of the DRP1 signal indicating the end of the expansion of a code and the end-of-line code EOL do not coincide with one another if an error is present in the MR codes. Having confirmed the absence of error in the expansion, the EOL detecting circuit 10-7 generates a signal DRP2 for reading a first MR code in a next line.

Figure 18:
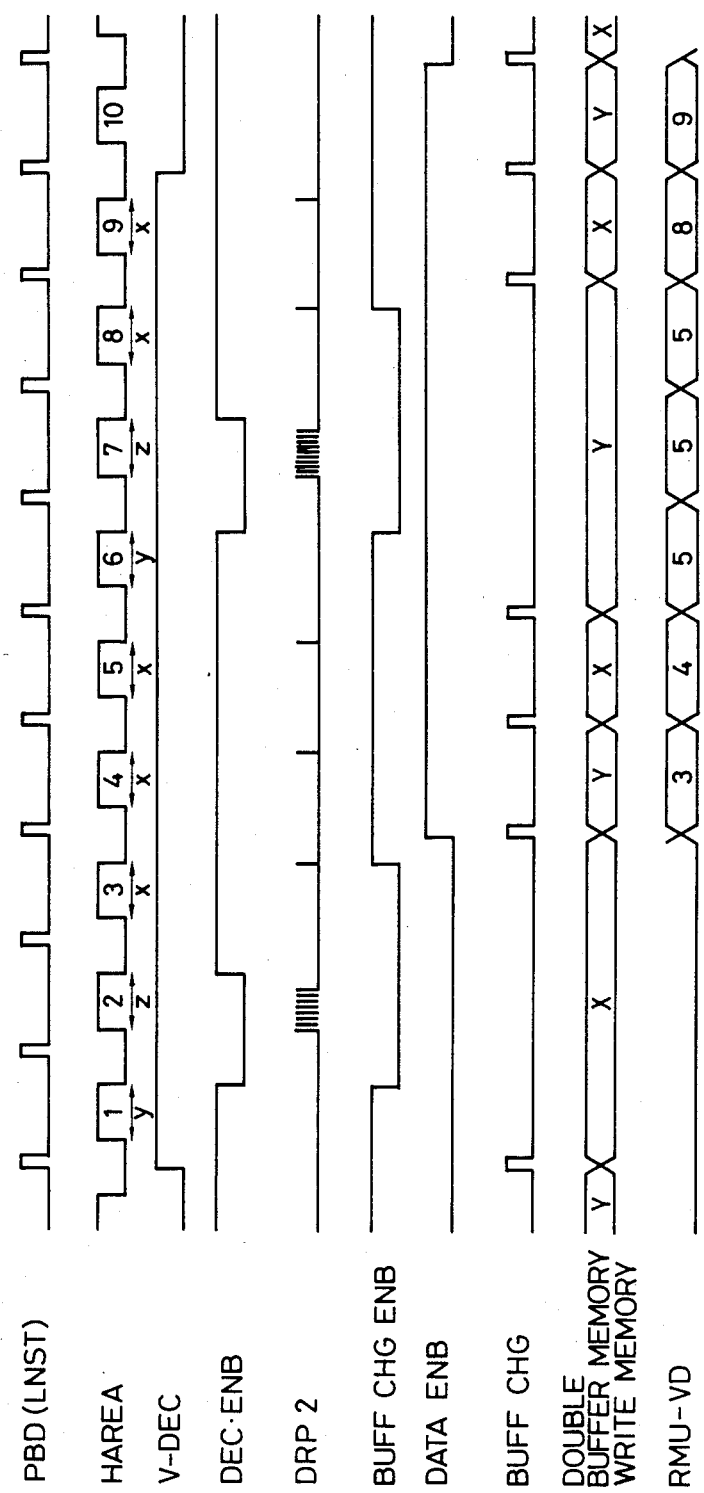
FIG. 18 is a timing chart showing an operation in an expansion error.

Now reference is made to FIG. 18 for explaining a line operation in case of an expansion error. As shown in FIG. 18, the main scanning address counter-decoder 10-12 generates the main scanning expansion section signal H-AREA in response to the line synchronization signal PBD supplied from the printer 10-3, regardless of the V-DEC signal. When said sub-scanning expanding section signal V-DEC from the controller 10-2 is at the L-level, the DECENB signal and the BUFF CHG ENB signal from the EOL detecting circuit are at the H-level, and the BUFF CHG signal for switching the double buffer memory is constantly generated. On the other hand the DATA ENB signal is at the L-level so that the image signals RMU-VD to the printer are fixed at the L-level by the AND gate 10-28.

The controller 10-2 shifts the V-DEC signal to the H-level for starting the image expansion, and thereafter the image expansion is conducted line by line according to HAREA1, HAREA2, ..., HAREA9. The area of HAREA in the image expansion is divided into three states; a state x for normal image expansion, a state y involving an expansion error, and an expansion error recovery state z in which the DECENB signal from the EOL detecting circuit is at the L-level.

The expansion circuit 10-6 starts the image expansion at the HAREA1 in a line immediately succeeding the shift of the V-DEC signal to the H-level. If an expansion error occurs in the first HAREA1 (state y) as shown in FIG. 18, the EOL detecting circuit 10-7 shifts the signals BUFF CHG ENB and DECENB to the L-level at the end of the HAREA1, thereby interrupting the switching of the double buffer memory and the image expansion of the expansion circuit 10-6 in the succeeding line HAREA2 and effecting an EOL detecting step for expansion error recovery (state z).

The EOL detecting circuit 10-7 repeats the generation of the DRP2 signal, until an EOL code FFH is detected in the codes MR read from the compressed image memory 10-5 during the H-level period of the HAREA signal. The detection of the EOL code recovers the synchronization between the compressed image data and the HAREA signal. Then a first code MR in the succeeding line HAREA3 for image expansion therein, and the DECENB signal is shifted to the H- level to complete the expansion error recovery operation.

Upon completion of a normal image expansion (state x) in the succeeding line HAREA3, the EOL detecting circuit generates the DRP2 signal for reading a first MR code in the succeeding line HAREA4, then shifts the BUFF CHG ENB signal to the H-level, and, in response to the LNST signal entered thereafter, shifts the DATA ENB signal to the H-level.

The image expansion proceeds in normal manner in the lines HAREA4 and HAREA5 so that the BUFF CHG ENG signal remains in the H-level, but an expansion error occurs in a line HAREA6 as in the line HAREA1. Thus the EOL detecting circuit shifts the BUFF CHG ENB signal to the L-level at the end of the line HAREA6 to prohibit the output of the expanded image data involving said expansion error and stored in the memory Y of the double buffer memory, thereby prohibiting the switching operation of the double buffer memory 10-15 until the image expansion is successfully effected in a line HAREA8. Thus, in a period of error recovery in the line HAREA7 and in a period of succeeding image expansion in the line HAREA8, the successfully expanded image data of the line HAREA5 are repeatedly supplied from the double buffer memory 10-15 as the signal RMU-VD to the printer.

As explained in the foregoing, the BUFF CHG signal is not generated by the BUFF CHG ENB signal in a line involving an expansion error and in a succeeding line. Thus the image data of a successfully expanded line (state x) are supplied, as the RMU-VD signal, to the printer 10-3, as shown in FIG. 22.

The DATA ENB signal is shifted to the H-level state as explained before only when a line is successfully expanded after the start of image expansion, and the output of expanded image data involving an expansion error is prohibited by said DATA ENB signal in a period rom the shift of the V-DEC signal to the H-level to successful expansion of a line.

Also the DATA ENB signal is shifted to the L-level with a delay of one line from the shift of the V-DEC signal to the L-level, so that the expanded image in the final line HAREA9 can be properly supplied to the printer.

The controller 10-2 causes an expansion error counter 10-35 to count the LNST signals generated during the L-level state of the BUFF CHG ENB signal, thereby determining the number of lines involving expansion errors and lines of error recovery. This count represents the number of unsuccessfully expanded lines. In case said count exceeds 8 lines, the controller 10-2 identifies a misprint resulting from expansion errors and, for example, shifts the VDEC signal to the L-level to terminate the image expanding operation. In this manner the expansion errors can be detected before the completion of image expansion of a page, and can therefore be coped with in prompt manner.

At the image expansion, the controller 10-2 releases the sub-scanning expanding section signal V-DEC by counting lines, with the line counter 10-11, of a number same as that in the generation of the V-ENC signal at the image compression.

Consequently, in the absence of expansion errors in the course of image expansion, the value of the address output MADR from the memory address counter 10-8 becomes equal to the final value of MADR at the image compression simultaneously when the controller 10-2 shifts the VDEC signal to the L-level in response to an output signal from the line counter 10-11, indicating the completion of counting of a determined number of sub-scanning lines.

Since the final value of MADR at the image compression is set in the comparator 10-14, the controller 10-2 should detect the MOVER signal when the VDEC signal is shifted to the L-level.

However, in case of an expansion error in the course of image expanding operation, the EOL detecting circuit 10-7 skips the MR codes in search of the EOL code for expansion error recovery, so that the line counter 10-11 will not complete the counting when the MOVER signal is generated. Even if the V-DEC signal is continued to complete the remaining counting operation, the memory address counter 10-8 has already stopped the counting operation by said MOVER signal. Consequently the image data of an address corresponding to the count of the memory address counter 10-8 when it is stopped by the MOVER signal are repeatedly supplied to the expansion circuit 10-6, so that all the remaining lines will become unsuccessfully expanded lines.

In order to prevent such situation, the controller 10-2 periodically checks the MOVER signal while awaiting the count-up of the line counter 10-11 in the H-level state of the VDEC signal, and, upon detection of said MOVER signal in the H-level state of the VDEC signal, immediately shifts the VDEC signal to the L-level, thereby interrupting the image expansion and preventing the counting of excessive unsuccessfully expanded lines.

In this manner it is rendered possible to record unnecessary image signals on the printer 10-3, by terminating the image expansion when the memory address counter reaches the maximum address at the image compression.

In the following there will be explained a case of printing a trimmed part of the expanded image signals onto an arbitrary position of the print sheet.

Figure 19:
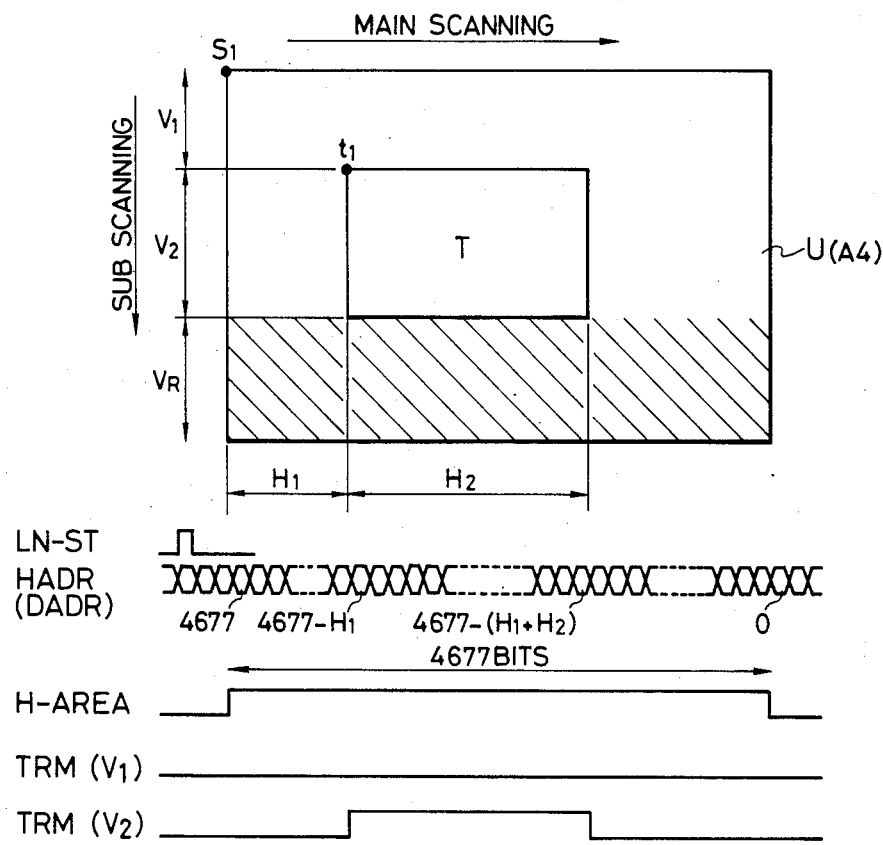
FIG. 19 is a schematic view showing a trimming operation in the main scanning direction.

FIG. 19 shows a case of trimming an A4-sized expanded image U, starting from a reference point tl which is distant by H1 bits in the main scanning direction and by V1 bits in the sub scanning direction from a point S1, to obtain a trimmed image of a size of H2 bits in the main scanning direction and V2 bits in the sub scanning direction, and printing said trimmed image on an A4-sized print sheet without changing the positions V1 and H1.

The image expansion of a line is initiated by the synchronization signal LN-ST generated by the PBD signal from the printer as explained before, but, in case of FIG. 19, said image expansion is started when the value of HADR from the main scanning address counter-decoder 10-12 reaches 4677. A value 4677 is set in the comparator 14-4 in order that the HAREA signal assumes the H-level state when the HADR reaches 4677. Also a value 0 is set in the comparator 14-5 so that the length of the HAREA signal becomes equal to 4677 bits, in order to terminate the image expansion at 467 bits corresponding to the width of A4 size. Also a value 4677 is set in the comparator 14-8 for determining the timing of a DC START signal, and the same value 4677 is set in the counters 13-1, 13-2 of the dither counter 10-10 in order that the DADR and HADR respectively writing and reading, to and from the double buffer memory 10-15, the extended image signals DVDO will perform functions in the same manner. Consequently the image signals compressed from the image U are expanded without change.

Figure 20:
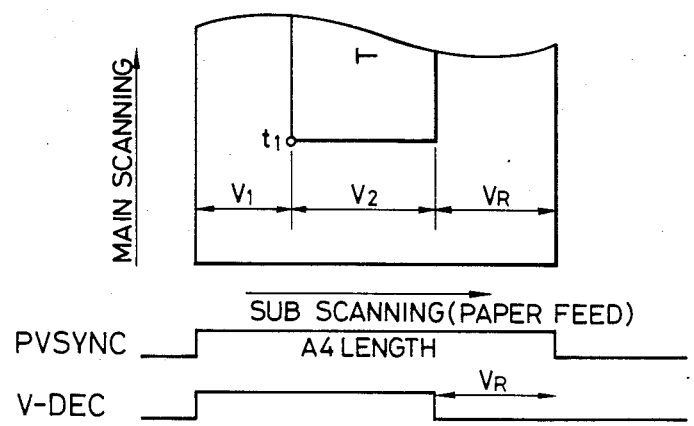
FIG. 20 is a schematic view showing a trimming operation in the sub scanning direction.

As shown in FIG. 20, the controller 10-2 simultaneously releases the sheet feed signal PVSYNC to the printer 10-3 and the sub-scanning expansion section signal V-DEC, thereby initiating the image expansion simultaneously with the sheet feeding in the printer. If image trimming is not require, the V-DEC signal is released for a same duration as the PVSYNC signal, whereby the entire expanded A4-sized image U is printed on the A4-sized print sheet. In order to erase the image signals of V1 lines for the aforementioned trimming, the controller 10-2 fixes a TRM signal to the L-level during a period of said V1 lines after the output of the V-DEC signal, whereby the image signals are fixed to the L-level by the gate 10-27. For this purpose a value 1FFFH is set in the comparator 14-6 for releasing the TRM signal during the counting of said V1 lines, and a value 4677 (1245H) is set in the comparator 14-7, so that the flip-flop 14-12 can only be reset. After counting V1 lines with the line counter 10-11, there is conducted a trimming to form the area T with widths of V2 lines in the sub-scanning direction and H2 bits in the main scanning direction. For this purpose a value V2 is set in the line counter 10-11 to count V2 lines in the sub-scanning direction, and a value (4677−H1) is set in the comparator 14-6 while a value (4677(H1+H2)) is set in the comparator 14-7 for generating the TRM signal indicating a width of H2 bits from a point t in the main scanning direction. In this manner there is obtained the TRM signal (V2 bits) as shown in FIG. 19.

By the foregoing constant setting the area T is formed by a trimming of V2 lines from the point t1. After all the image signals of the area T are supplied to the printer, the line counter 10-11 supplies a count end signal for V2 lines to the controller 10-2. At this point the compressed image codes corresponding to a hatched area in FIG. 19 are not yet read from the compressed image memory 10-5, but such remaining codes need not be expanded because the image of the desired area T is already obtained. Consequently the controller 10-2 shifts the VDEC signal to the L-level at this point, thereby interrupting the image expanding operation. In response the DATA ENB signal from the EOL detecting circuit is shifted to the L-level so that white signals (L-level) appear in the remaining line $V_R$. The absence of expansion or the unnecessary compressed image codes reduces the rate expansion errors, thereby reducing the rate of misprints resulting from such expansion errors and improving the reliability of printing operation.

Now reference is made to FIG. 21 for explaining a case in which the image signals T, obtained by trimming shown in FIG. 19, are supplied to the printer 10-3 with a movement to a position distanced by H3 bits from the sheet end in the main scanning direction.

Figure 21A:
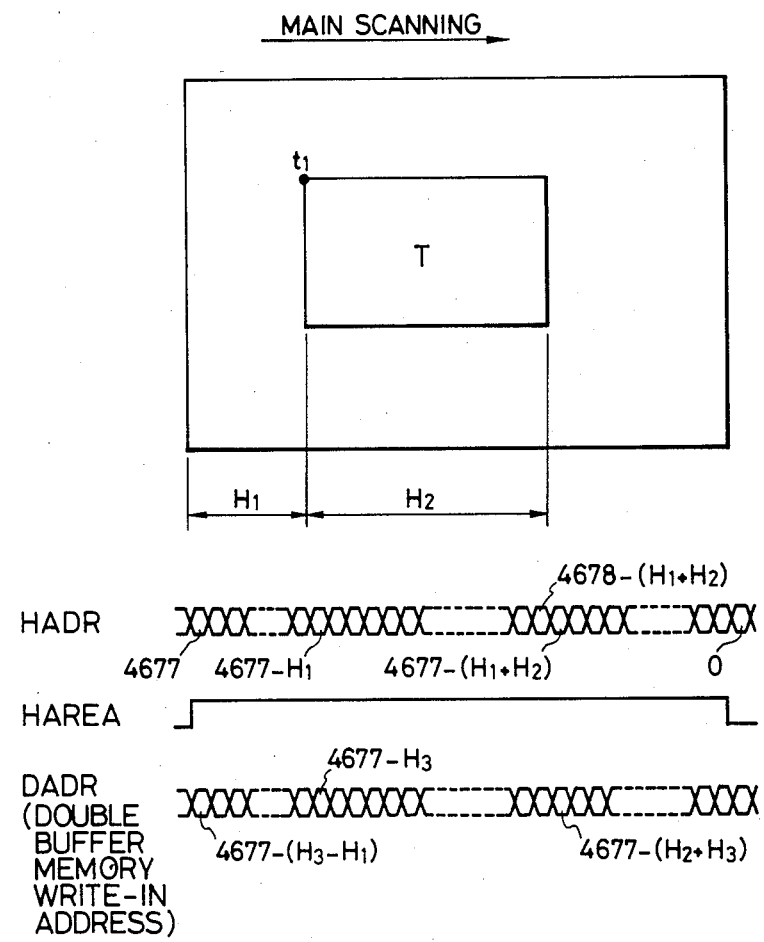
FIGS. 21(a) and 21(b) are schematic view showing an image moving operation in the main scanning direction.
Figure 21B:
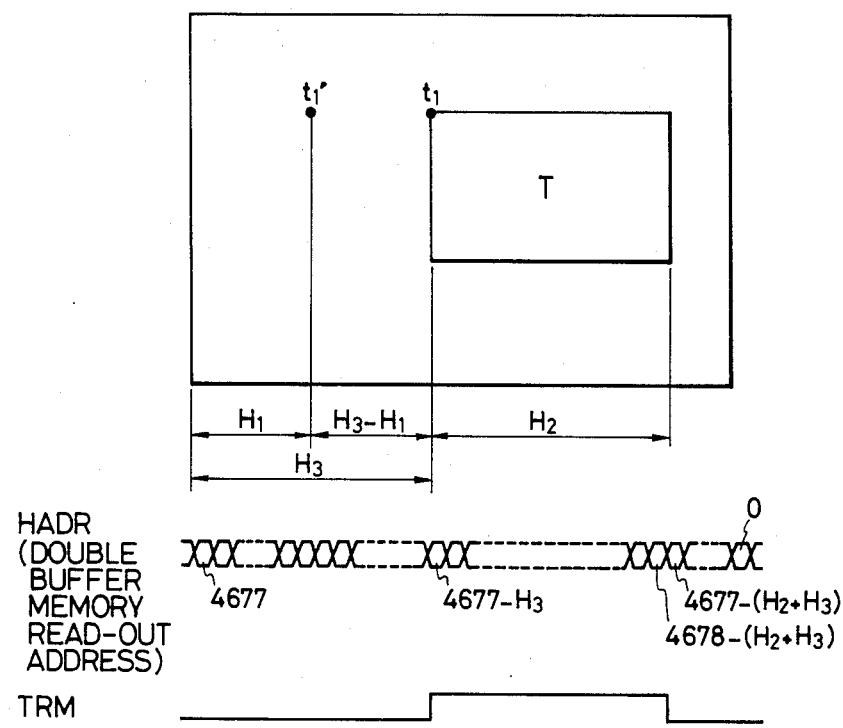

In this case the expanded image is moved by a line in the storage in the double buffer memory, and the trimming of the area T is effected at the readout of said image from said memory. The movement and trimming of said expanded image is carried out with reference to HADR. More specifically, as shown in FIG. 21(a), the signals of the area T, expanded in the expansion circuit 10-6 in an address range from HADR (4677−H1) to HADR (4678−(H1+H2)), are stored in the double buffer memory, and are read therefrom in a range from HADR (4677−H3) to HADR (4678−(H2+H3)) with a movement of H3−H1 bits. This image movement is achieved by controlling the address signal DADR in such a manner that the area T of the expanded image into the double buffer memory with an address DADR (4677−H3) corresponding to an address HADR (4677 H1), with a resulting movement of H3−H1. Thus, as will be apparent from FIG. 21(b), for a movement of H3−H1 bits in the main scanning direction, the count start value of DADR is selected as 4677−(H3−H1), corresponding to HADR=4677. Said value H3 is positive in case the image movement is in a direction away from the reference point in the main scanning direction (HADR=4677), and vice versa.

The image signals read from the double buffer memory are trimmed by the TRM signal, and values 4678−(H2+H3) and 4677−H3 are respectively set in the comparators 14-6 and 14-7 in order that said TRM signal assumes the H-level in a range from 4677−H3 to 4678−(H2+H3) in HADR.

Now reference is made to FIG. 22 for explaining a case of moving the expanded image signals in the sub scanning direction on the print sheet.

In this case, as shown in FIG. 22(a), an expanded image U is trimmed down to an area T which is then moved to an arbitrary position in the sub scanning direction. Since the method of trimming and of image movement in the main scanning direction is already explained before, there will be explained, in the following, the timing of sheet feeding and the timing of starting the image expansion in the sub scanning direction.

FIG. 22(b) shows a case in which the expanded image U is displaced in the sheet feeding direction with image trimming, and a point t1 of the trimming image is recorded at a position of V3 lines from the sheet end.

Since the expanded image U is displaced, by (V3−V1) lines in the sub scanning direction, from the print sheet, the controller 10-2 counts (V3−V1) lines with the line counter 10-11 after supplying the sheet feed signal PVSYNC to the printer 10-3 and shifts the sub-scanning expansion section signal VDEC to the H-level to initiate the image expansion of the image U. The image signals of the area T are released by the TRM signal after a lapse of V1 lines from the shift of said VDEC signal to the H-level. The VDEC signal is shifted to the L-level to terminate the image expansion when the line counter counts V2 lines corresponding to the sub-scanning range of the area T.

FIG. 22(c) shows a case in which the image expansion is started before the start of sheet feeding, and the point t1 of the trimmed image is recorded at a position of V3 lines from the sheet end. V3 is positive or negative respectively when the point t1 is present on the print sheet or not.

In case of FIG. 22(c), the image expansion of (V1−V3) lines has to precede the output of the sheet feed signal PVSYNC to the printer. Thus the controller 10-2 at first executes image expansion of (V1−V3) lines through the line counter 10-11, then interrupts the image expansion by shifting the VDEC signal to the L-level and awaits the timing of releasing the PVSYNC signal. Subsequently, at said timing, the VDEC signal is shifted again to the H-level to re-start the interrupted image expansion simultaneously with the start of sheet feeding. An image movement of (V1−V3) lines is achieved in this manner.

The trimming of the area T is conducted as explained before, but the area T recorded on the sheet will be reduced if the point t1 is positioned outside the sheet by V3 lines. In this case the VDEC-signal is shifted to the L-level after the initial image expansion of (V1−V3)

lines, and this mode enables the use of an RVSYNC signal from the reader as the PVSYNC signal. In case of overlaying an image expanded in the RMU with another image from the reader, a common VSYNC signal has to be used for exact registration of two images. However, since the VSYNC signal cannot be transmitted from the RMU to the reader, the RVSYNC signal from the reader has to be used as the PVSYNC signal. For the controller 10-2 which is not synchronized with the reader, it is quite difficult to know an exact timing of the entry of the RVSYNC signal. For this reason it is required, for the controller 10-2, to complete the image expansion of (V1−V3) lines sufficiently before the entry of the RVSYNC signal from the reader and to re-start the image expansion in synchronization with said RVSYNC signal. Consequently the VDEC signal is shifted to the L-level to interrupt the image expanding operation while the RVSNYC signal is awaited.

Naturally the reader needs not be synchronized if such overlaying operation is not required, and, in such case the output control of the PVSYNC signal can be achieved by the line counter 10-11 in a similar manner for the VDEC signal. It is therefore possible to release the PVSYNC signal without shifting the VDEC signal to the L-level for interrupting the image expansion.

(4) Dither Image Expanding Function

A mere expansion of the image compressed by dither compression explained in (2) will give rise to an expanded image different from the original image, because of the rearrangement of pixels by the dither counter 10-10 at the image compression. Consequently, in the expansion of dither compressed image, the expanded image signals DVDO obtained from the expansion circuit 10-6 in a same process as in the binary expansion process (3) are rearranged to the original sequence at the storage in the double buffer memory 10-15.

Said rearrangement is achieved by changing the sequence of the addresses ADAR for writing into the double buffer memory 10-15 at the image expansion.

More specifically, the image signals, which are arranged as shown in (16-3) in FIG. 16, are rearranged at an interval of 8 bits to restore the sequence shown in (16-2) by activating the counters 13-1, 13-2 in the same manner as in the dither compression, through DITHER signals from the dither counter shown in FIG. 11.

The controller 10-2 may load arbitrary values in the counters 13-1, 13-2 for moving the expanded image in the same manner as in the binary image expansion, but the value loaded in the counter 13-1 has to be same as employed in the dither compression, since otherwise the sequence of pixels in each block of the dither pattern will be aberrated. In the comparator 13-3 there will be set a value obtained by subtracting (N−1) from the value loaded in the counter 13-2, wherein N is the number of blocks employed in the dither compression.

In the following there will be explained the details of serial communication and image processing operation between the reader and RMU or between the RMU and printer. The programs shown in the following flow charts are stored in advance in read-only memories of microcomputers constituting control units of the reader, printer and RMU and are suitably read to execute control operations.

The serial communication shown in FIG. 6 is initiated by a command from the reader to the printer or RMU, when all the units, including RMU, are rendered ready for serial communication by the signals DEVICE CONNECT, DEVICE POWER READY and CONTROLLER POWER READY shown in FIG. 8. In response to said command the printer supplies a response or status signal to the reader side units, including RMU. In principle, when the RMU receives a command from the reader, it sends the same command to the printer, and when it receives a status signal from the printer, it sends the same status signal to the reader.

The serial communication between a reader-side unit and a printer-side unit is effected by the exchange of an 8-bit command and an 8-bit status. A command is always responded to by a status signal which never precedes the command.

Figure 23:
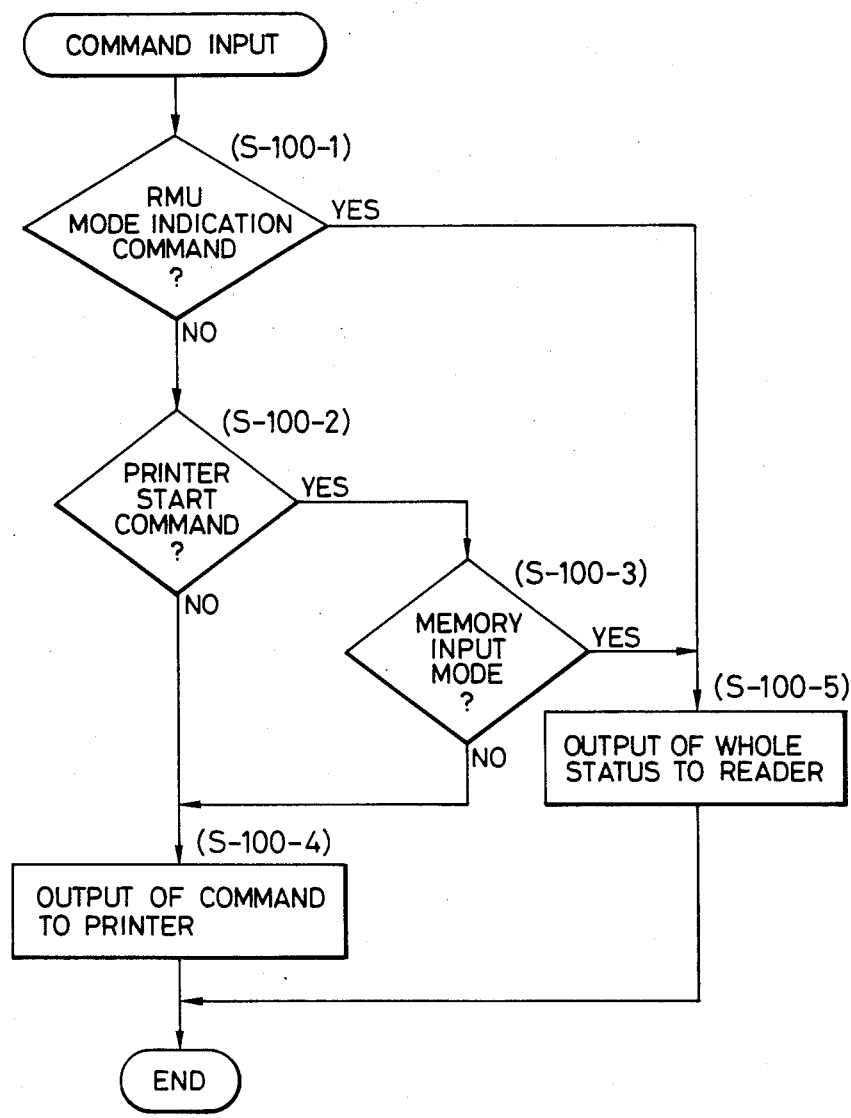
FIG. 23 is a flow chart showing a procedure of serial communication of a command.

FIG. 23 shows a process of the RMU for a command.

At first the RMU receives a command from the reader. In case said command is one of RMU mode indicating commands 100-7–100-14 shown in Tab. 1; an RMU memory indicating command; an RMU trimming indicating command 1; an RMU trimming indicating command 2; an RMU trimming indicating command 3; an RMU trimming indicating command 4; an RMU trimming indicating command 5; and an RMU trimming indicating command 6 (these eight commands collectively called RMU indicating commands) (S-100-1), a total status is returned to the reader for each command of 1 byte (S-100-5). If the entered command is not one of the RMU indication commands, the RMU identifies if it is a printer start command 100-1 shown in Tab. 1 (S-100-2). Said printer start command is released from the reader following said RMU indication command when the RMU is connected to the system, so that the RMU mode, to be explained later, should have been fixed at this point. If said RMU mode is an "input mode" to be explained later, in which the printer does not perform printing operation, the RMU does not send said printer start command to the printer but supplies a total status, to the reader (S-100-3, S-100-5). Also a command including information necessary for the function of RMU, such as a sheet size indicating command is stored in a command memory of the RMU and is then sent to the printer (S-100-4).

Figure 24:
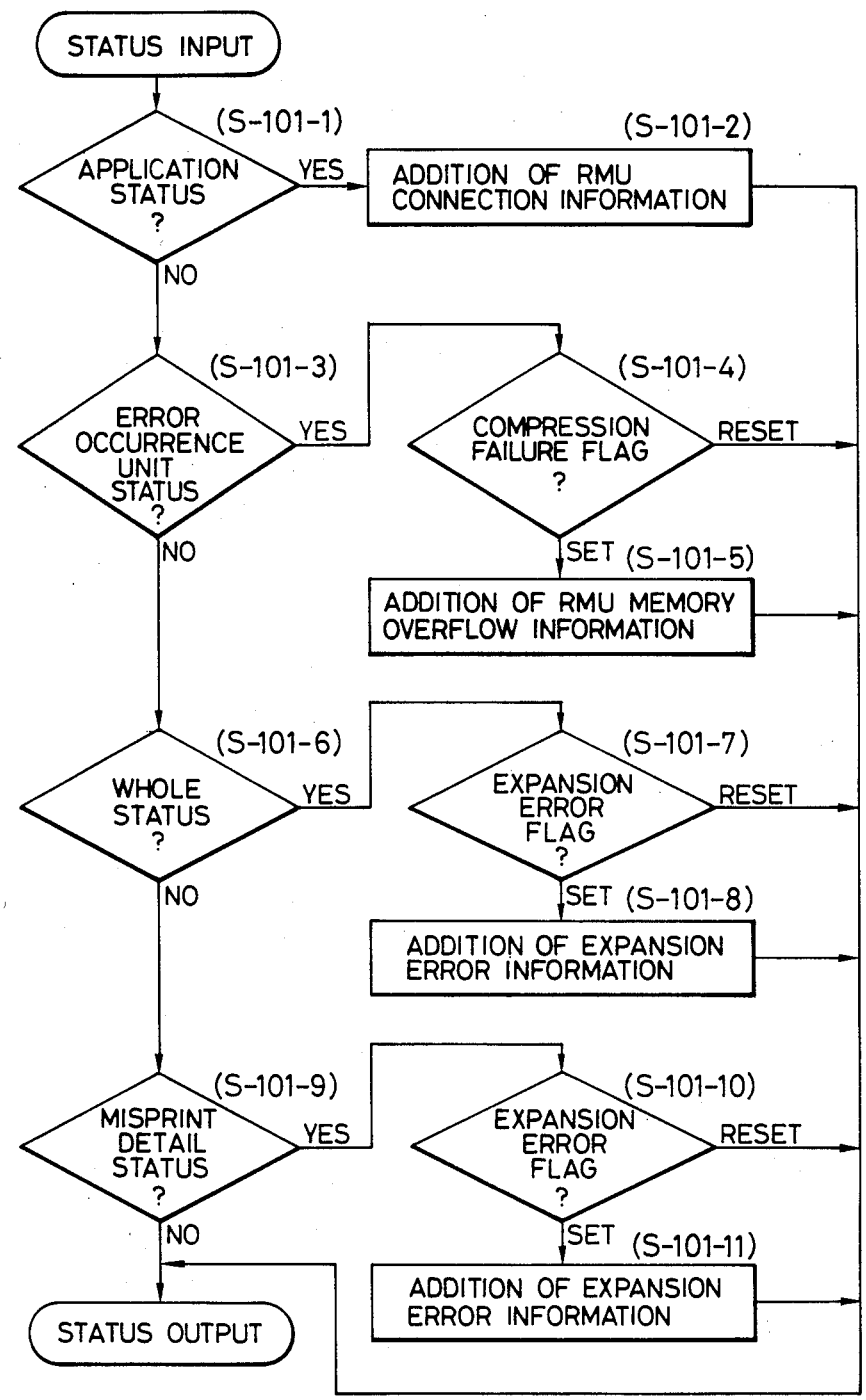
FIG. 24 is a flow chart showing a procedure of serial communication of a status.

Now reference is made to FIG. 24 for explaining a process of the RMU for a status signal. When the printer receives a command sent from the reader through the RMU, the printer sends a status code to the RMU within a determined time.

Upon receiving a status code from the printer, the RMU identifies to which command said status code correspond, and checks whether said status code is an application status corresponding to an application status demand command (S-101-1). If so, the RMU sends said status to the reader after adding information that the RMU is connected (S-101-2).

Also the RMU identifies if the status from the printer is an error occurrence unit status code (S-101-3), and sends said error unit status code to the reader, with or without addition of information on compression failure (RMU memory overflow) respectively when a compression failure flat, to be explained later, is set or reset. It also identifies whether the status code from the printer is a total status code or a misprint detail status code (S-101-6, S-101-9), and sends said status code to the reader with or without addition of information on an expansion error respectively when an expansion error flag, to be explained later, is set or reset (S-101-8, S-101-11).

In this manner the RMU, in response to a command entered from the reader, transmits said command to the printer or sends a total status code to the reader, and in response to a status code entered from the printer, transmits said status code to the reader with or without addition of information.

Thus, in the system including the RMU, said RMU fetches necessary information only and merely transmits other information. Thus the communication protocol can be simplified as the entire communication is administered by the reader.

In the following there will be given a detailed explanation on the commands and status codes employed in the serial communication among the reader, RMU and printer shown in FIGS. 23 and 24.

Tab. 1 lists execution commands instructing an execution to the RMU or printer. In response to said execution command, the RMU or printer sends a total status code, to the reader. In Tab. 1, there are shown a printer start command 100-1 for requesting the start of a print operation in the printer; a printer stop command 100-2 for requesting the printer to stop the printing operation; sheet feed indicating commands 100-3, 100-4 for indicating a sheet cassette; a sheet size indicating command 100-5 for indicating a sheet size, in which bits 1 to 6 of a second byte indicate various sheet sizes such as A4, A3, B4, B5, A4-R, B5-R, etc. in encoded forms as shown in Tab. 2; a sheet number indicating command 100-6 in which bits 1 to 6 of a second byte are used to indicate a copy number up to 64 copies; an RMU mode indicating command 100-7 of which second byte contains the information on the RMU modes as shown in Tabs. 4 and 5; an RMU memory indicating command 100-8 for indicating a memory area in the RMU, in which second byte stores the content of memory areas as shown in Tab. 6; and RMU trimming indicating commands 100-9, 100-10, 100-11, 100-12, 100-13, 100-14 of which second and third bytes are used to indicate the amount of trimming in units of millimeters from 0 to 512 mm.

Status request commands request the information on the RMU or printer. In response to one of said commands, a status code is sent to the reader through the RMU, with or without addition of information on a memory overflow or an expansion error by the RMU.

In the following status codes will be explained further. The total status code contains information on the general status of the printer or RMU. A bit 5 is set ("1") when a sheet is in transportation in the printer. Similarly a bit 4 indicates a misprint, a bit 3 indicates a waiting state, and a bit 1 indicates an operator call error or a serviceman call error. An error occurrence unit status code indicates a unit in which an error has occurred, while an operator call error status and a serviceman call error status indicate the details of such errors. Similarly a cassette sheet size status code indicates information on sheet size such as A4, B5 or B4, while an application status code indicates information on the units connected to the system, and a misprint detail status code indicates information on misprint.

The system administration is therefore facilitated since the reader can know the situation of the entire system or the cause of error by collecting these status codes.

Figure 25:
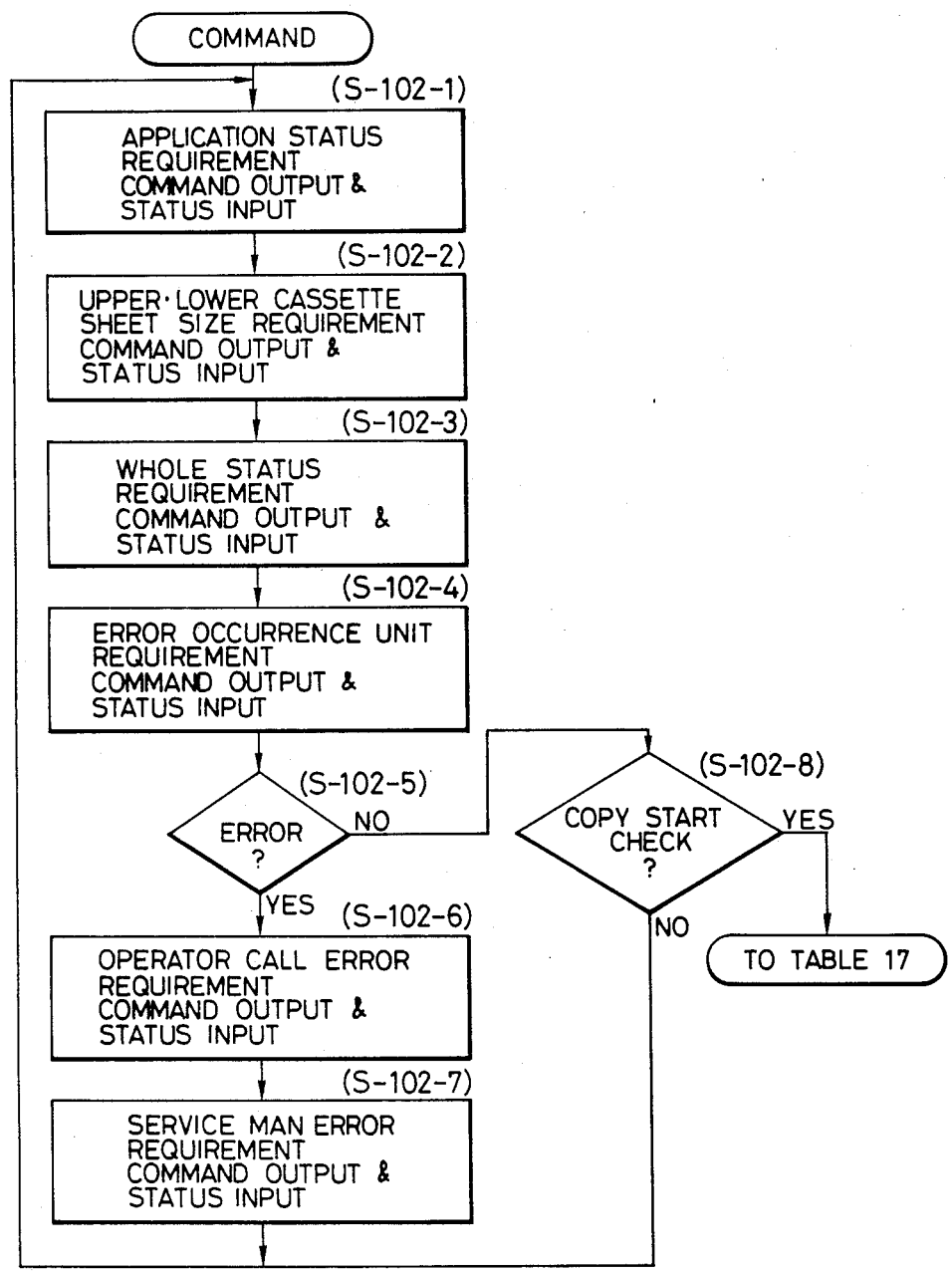
FIG. 25 is a flow chart showing a procedure of communication prior to a copying operation.

Now reference is made to FIG. 25 for explaining a serial communication with the above-explained commands and status codes, when a copying sequence is not in execution.

The reader releases the application status request command, and knows that the RMU is connected to the system from the application status code (S-102-1). Also information on the sheet sizes in upper and lower cassette of the printer is obtained by cassette sheet size status codes responding to a lower cassette sheet size request command and an upper cassette sheet size request command (S-102-2). Then there is obtained information on the presence of an error in the printer or RMU by the total status and the error unit status, responding to the total status request command and the error unit status request command (S-102-3, S-102-4). Subsequently there is checked whether an error is present (S-102-5). If an error is present, the operator call error status request command or the serviceman call error status request command is released, then more detailed information is obtained by a corresponding status code (S-102-6, S-102-7), and necessary information such as the absence of print sheets or the RMU memory overflow can be displayed to the operator. In the absence of an error, there is identified whether a copy start key has been depressed (S-102-8), and, if depressed, there is conducted a serial communication in copy sequence execution as. If said key is not depressed the above-explained procedure is repeated until the copy start key is depressed.

Now explaining serial communication, and functions and signals of various units in the course of copying sequence.

In the reader, the operator enters, through an operation unit, the selection of sheet size (A-(1)), instruction of copy number (A-(2)), image reading mode (A-(3)) and RMU using conditions (A-(4)) such as RMU mode, trimming data and selection of RMU memory. Then, in response to the depression of the copy start key (A-(5)), the reader releases, in serial communication, the RMU indicating commands (RMU mode indicating command, RMU memory indicating command and RMU trimming indicating commands) (B-(1)). In response to said RMU indicating commands, the RMU sets the selectors 1, 2, 3, 4, 5 and the video selector shown in FIG. 10 (C-(1)). Subsequently the reader releases the sheet number indicating command (B-(2)), upper/lower sheet feed command (B-(3)) and sheet size indicating command (B-(4)). Upon reception of the sheet size indicating command (C-(2)), the RMU sets the comparators, dither counter, main scanning counter, etc. shown in FIG. 10 (C-(3)). In case the RMU is set at the "memory input mode", the RMU does not transmit the printer start command to the printer, so that the printer does not send a print sheet ready signal PREQ to the RMU. Consequently the RMU sends, instead of the printer, said PREQ signal to the reader (B-(6)). In another mode of the RMU, the printer start command is transmitted to the printer, which, in response, starts a prerotation step for preparing for the printing (E-(1)). Then, when the print sheet becomes ready for feeding, the printer sends the signal PREQ to the RMU (D-(5)), which transmits said PREQ signal to the reader (B-(6)). Upon reception of said PREQ signal, the reader sends a print sheet feed signal PRINT to the RMU (B-(7)). In the "memory input mode" of the RMU, the PRINT signal is transmitted to the printer (D-(6)), and the RMU sends an image request signal VSREQ to the reader (B-(88)) as if the printer sends said VSREQ signal in response to the PRINT signal. In response to the VSREQ signal from the RMU, the reader releases the VSYNC signal (B-(9)) for the image signal output. During the copying operation the reader periodically releases the total status request command, and error unit request command to constantly check errors, RMU memory overflow etc. (B-(10)). In response to the printer stop command received from the reader which controls the copy number, the RMU executes a mode resetting (C-(4)) to terminate the copying operation.

The RMU has four image input/output modes according to the RMU indicating commands from the reader 10-1.

The first is a "memory pass mode" in which the RMU transmits two ternary image signals RVDA, RVDB from the reader 10-1 to the printer 10-3, as if the reader 10-1 and the printer 10-3 are directly connected. In this mode, therefore, the RMU merely transmits the signals entered from the reader 10-1 through the video interface to the printer 10-3, and those received from the printer 10-3 to the reader 10-1.

The second is a "memory high-speed mode" in which the RMU compresses and stores the image signals RVDA from the reader 10-1 in the compressed image memory, and in succession reads and expands the compressed image data and supplies the same to the printer.

This mode enables a high-speed high-volume copying since the copying operation relying on a mechanical reciprocating scanning motion in the reader 10-1 is conducted only once and the second and ensuing copies are obtained by repeatedly supplying the printer with the compressed image data, stored in the compressed image memory of the MRU, after expansion, without any mechanical movement.

The third is a "memory input mode" in which the printer 10-3 is not operated and the MRU compresses the image signals supplied from the reader 10-1 and stores the same in the compressed image memory.

The fourth is a "memory overlay mode" in which the MRU expands the image data stored in the compressed image memory, synthesizes said data with image signals supplied from the reader and supplies the synthesized signals to the printer 10-3.

This function provides a copy in which an image stored in the RMU is overlaid with the image of an original read by the reader 10-1.

The "memory high-speed mode" is classified, in the RMU, into three modes; a "retention mode", an "output mode" and a "throughout mode". In the "retention mode", the image signals from the original are transmitted to the printer while they are also compressed and stored, for the first copy in the memory high-speed mode. The retention mode allows to discriminate whether the compression and storage in the memory is successful or failed with RMU memory overflow. The reader can obtain information, by releasing the error unit request command in the course of copying operation, on whether the compression and storage is successful or failed with RMU memory overflow, and, if successful, the reader terminate the scanning operation since second and following copies can be prepared by image expansion from the memory. The RMU sets the selectors again for enabling image expansion for the second and ensuing copies. For example the video selector 10-23 shown in FIG. 10 is set again in order to supply the expanded image to the printer. A mode in which the selectors are thus set anew is called "output mode". On the other hand, if the compression and storage in the memory are not successful, there is required an operation not involving signal compression and storage, since, in the "retention mode" the signals are transmitted and also compressed and stored despite of an insufficient memory capacity. Such mode is called "throughout mode", in which the selectors are set in the same manner as in the "memory pass mode", but the image signals from the reader are binary ones with mutually same threshold values in the threshold generators A, B, in contrast to ternary image signals consisting of independent signals VDA, VDB in the latter. By a change in said RMU internal modes, the RMU can supply the printer with binary image signals regardless of the success or failure of the image compression and storage in the storage in the "memory high-speed mode", thus avoiding the difference in image between the first copy and the second and ensuing copies".

Figure 26:
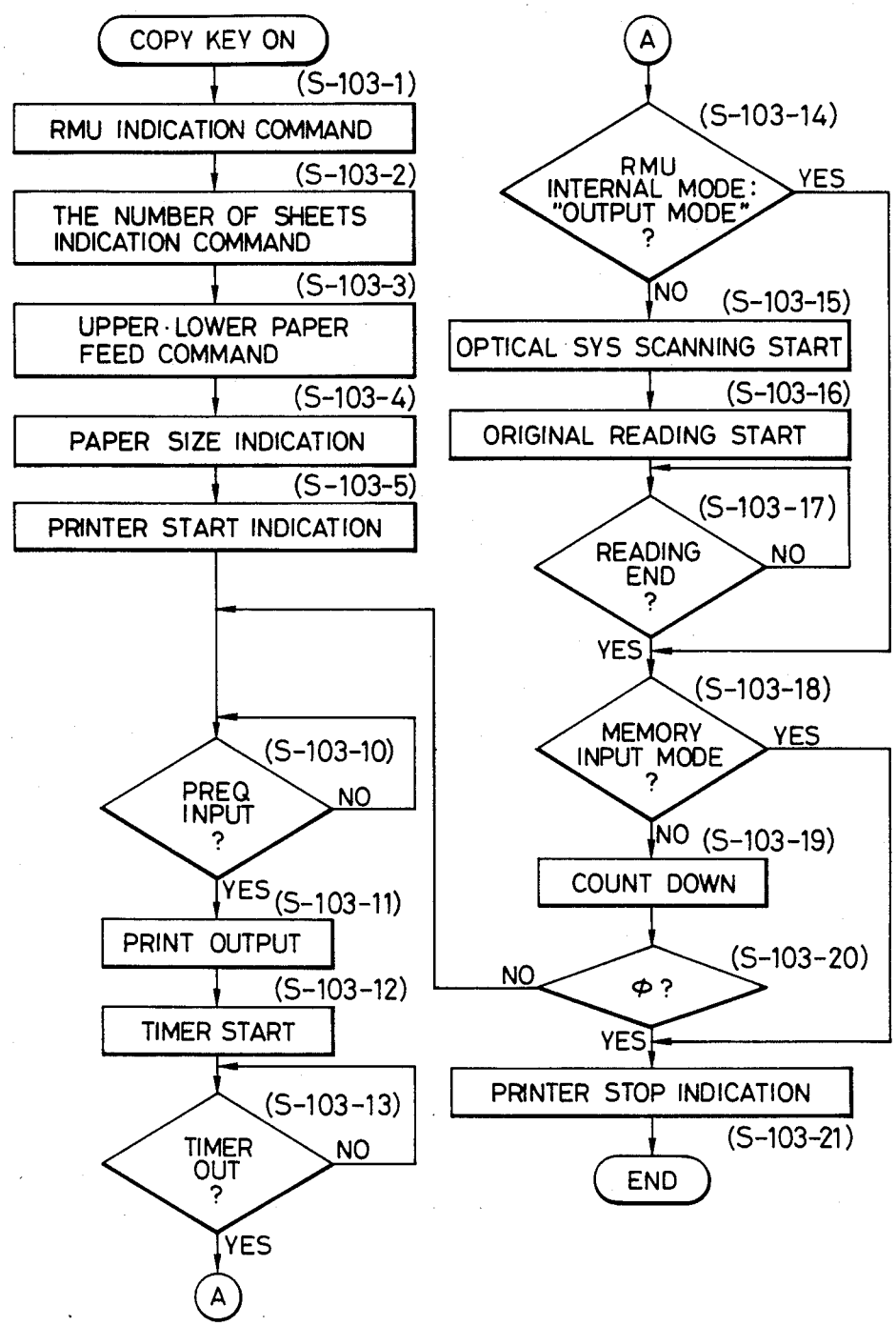
FIG. 26 is a flow chart showing the function of the reader.

Now reference is made to a flow chart shown in FIG. 26, for explaining the function of the reader.

When the copy start key is depressed by the operator, the reader supplies the RMU and the printer with the RMU indicating commands (S-103-1), sheet number indicating command (S-103-2), upper/lower sheet feed commands (S-103-3), sheet size indicating command (S-103-4) and printer start command (S-103-4) to make initializations required for copying operation. Upon reception of the PREQ signal from the RMU (S-103-10), the reader sends the PRINT signal to the RMU (S-103-11), then starts a timer (S-103-12), then awaits the expiration thereof (S-103-13), does not start the optical system if the RMU is in the "output" internal mode (S-103-14), counts the copy number downwards (S-103-19), then checks if the copy number has reached zero (S-103-20), and, if so, releases the printer stop command (S-103-21). If the RMU is set at an internal mode other than the "output mode", the reader activates the optical system (S-103-15) to start the original reading (S-103-16) to the image signals to the RMU. After the completion of the original reading is confirmed (S-103-17), the reader supplies the printer stop command to the MRU (S-1-3-21) without checking the copy number in case of the memory input mode in which only one image reading is accepted. In cases other than the "memory input mode" and "output mode", the reader counts the copy number downwards (S-103-19), and, if the copy number has reached zero, releases the printer stop command (S-103-21). On the other hand, if the copy number has not reached zero, the reader awaits the entry of the PREQ signal (S-103-10) and repeats the above-explained procedure.

Figure 27:
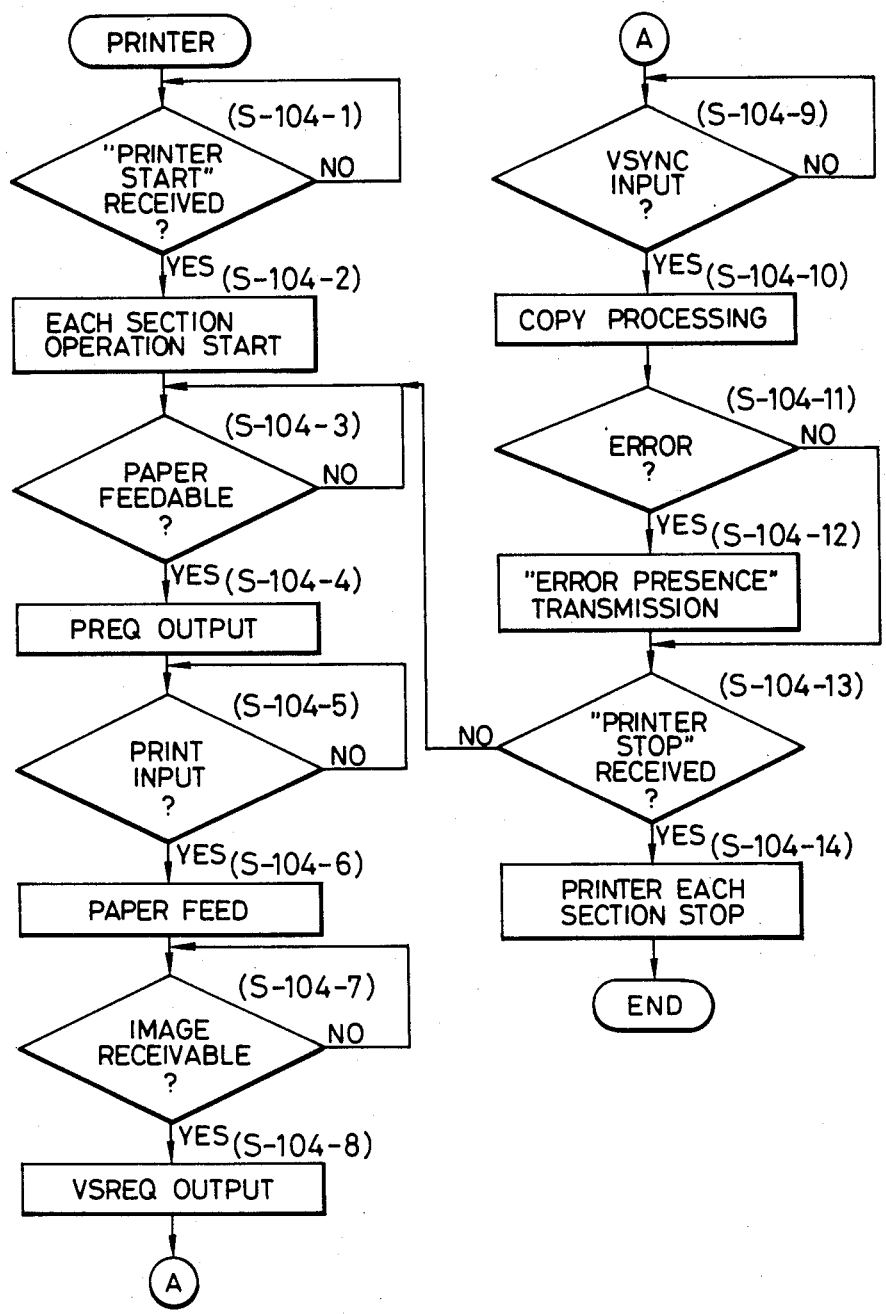
FIG. 27 is a flow chart showing the function of the printer.

Now reference is made to FIG. 27 for explaining the function of the printer.

Upon reception of the printer start command from the reader or RMU (S-104-1), the printer activates the function of various units such as for drum charging (S-104-2). When a print sheet becomes ready for feeding (S-104-3), the printer supplies the PREQ signal to the reader (S-104-4), and, upon receiving the PRINT command (S-104-5), sheet feeding is started (S-104-6). When the printer becomes ready to receive the image signals (S-104-7), it sends the VSREQ signal to the reader (S-104-8). In response the reader releases the VSYNC signal and the image signals (S-104-9). The printer executes the copying process (S-104-10), then checks the presence of an error (S-104-11), and reports the error, if present, by serial communication (S-104-12). When the above-explained procedure is repeated for the required number of copies, the reader releases the printer stop command. Thus the printer checks the reception thereof (S-104-13), and, upon reception thereof, stops various units (S-104-14).

Figure 28:
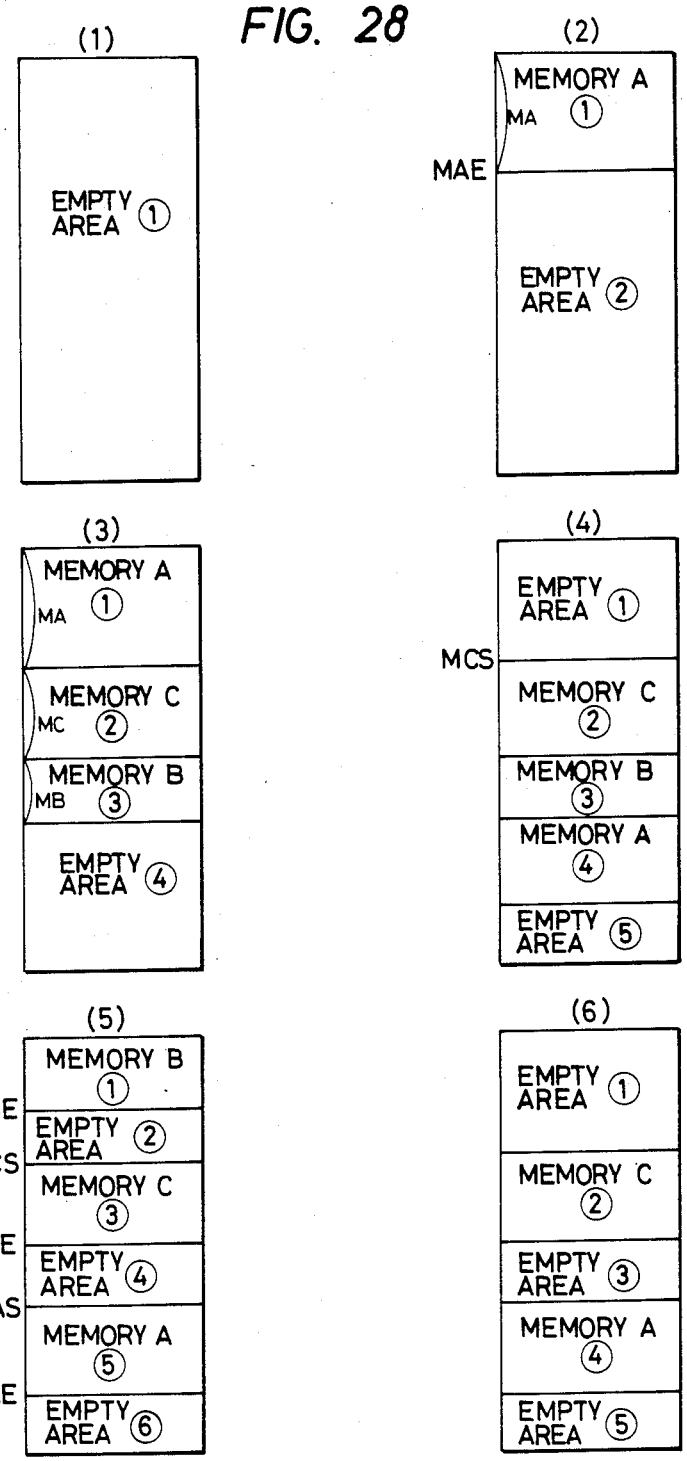
FIG. 28 is a view of memory areas.

Now reference is made to FIG. 28 for explaining the memory address administration by the RMU. In storing the compressed image signals in the memory, the RMU can arbitrarily set a write start address MS and a maximum write address ME in the memory. By the setting of said addresses MS and ME, the RMU can identify a success or a failure in the storage of the compressed image, and the already stored signals can be protected.

The maximum address of the memory is called MLMT. FIG. 28(1) shows a state in which no image signals have been stored in the RMU. In this state the addresses are so selected that MS=0, and ME=MLMT, and this setting indicates the maximum empty area of the memory. Now let us assume that a memory A is selected by the RMU memory indicating command, and an A4-sized copying is conducted in the dither memory high-speed mode. At this point the RMU stores the information MA-VIDEO on the mode of compression and storage of the image stored in the memory A as shown in FIG. 28(2), original size MA-PSZ of the compressed image, reading mode MA-METHOD of the reader, start address MAS of the image storage in the memory A, and end address MAE of the image storage in the memory A. The storage of such information is conducted also when image signals are stored in the memories B and C, and it is assumed that corresponding information is stored even when no image signals ar stored in the memory.

FIG. 28(3) shows a state in which signals are further stored in the memory areas B, C. When signal write-in into the memory B or C is instructed in the state of FIG. 28(2), an area (2), which is the largest empty area in the state of FIG. 28(2), is indicated by settings MS=MA-E+1 and ME=MLMT. If the memory A is again instructed, an area including empty areas above or below the memory A is indicated by setting MS=0 and ME-MLMT. These settings are same as in the selection of the memory A in the state of FIG. 28(1) and allow effective use of the memory. In case the memory A is instructed in the state of FIG. 28(3), in which no empty area is available adjacent to the memory A, the capacity of the memory A is compared with that of an empty area (4) in the state of FIG. 28(3) and the larger is designated as a new memory area A. Since the empty area (4) is larger in the illustrated example, there are made settings MS=MBE+1 and ME=MLMT, and the old memory area A is designated as an empty area. FIG. 28(4) shows a state in which image signals have been stored in the empty area (4) in the state of FIG. 28(3). If the memory B is selected for signal write-in in the state of FIG. 28(4), having no empty area connecting to the memory area B, an area of the largest capacity is selected from the memory area B, empty area (1) and empty area (5) and designated as a new memory area B. If the empty area (1) has the largest capacity, there are made settings MS=0 and ME=MCS−1 and the old memory area B is designated as an empty area. FIG. 28(5) shows a state in which image signals are successfully stored in said new memory area B, and FIG. 29(6) shows a state in which image storage has failed. In case of a failure of storage into a memory area, said area is designated as an empty area.

In this manner the number of empty areas can be equal, at maximum, to the number of memory selections. Effective memory administration can be achieved by calculating the memory capacities of said empty areas from MAS, MBS, MCS, MAE, MBE and MCE. Even in case of an image compression error in a new area designated by MS and ME, the information MA-VIDEO, MB-VIDEO or MC-VIDEO may be changed to indicate absence of image information, so that said area can be regarded as an empty area. Though three areas can be designated in the memory of the present embodiment, said number can be arbitrarily changed according to the memory capacity.

Figure 29A:
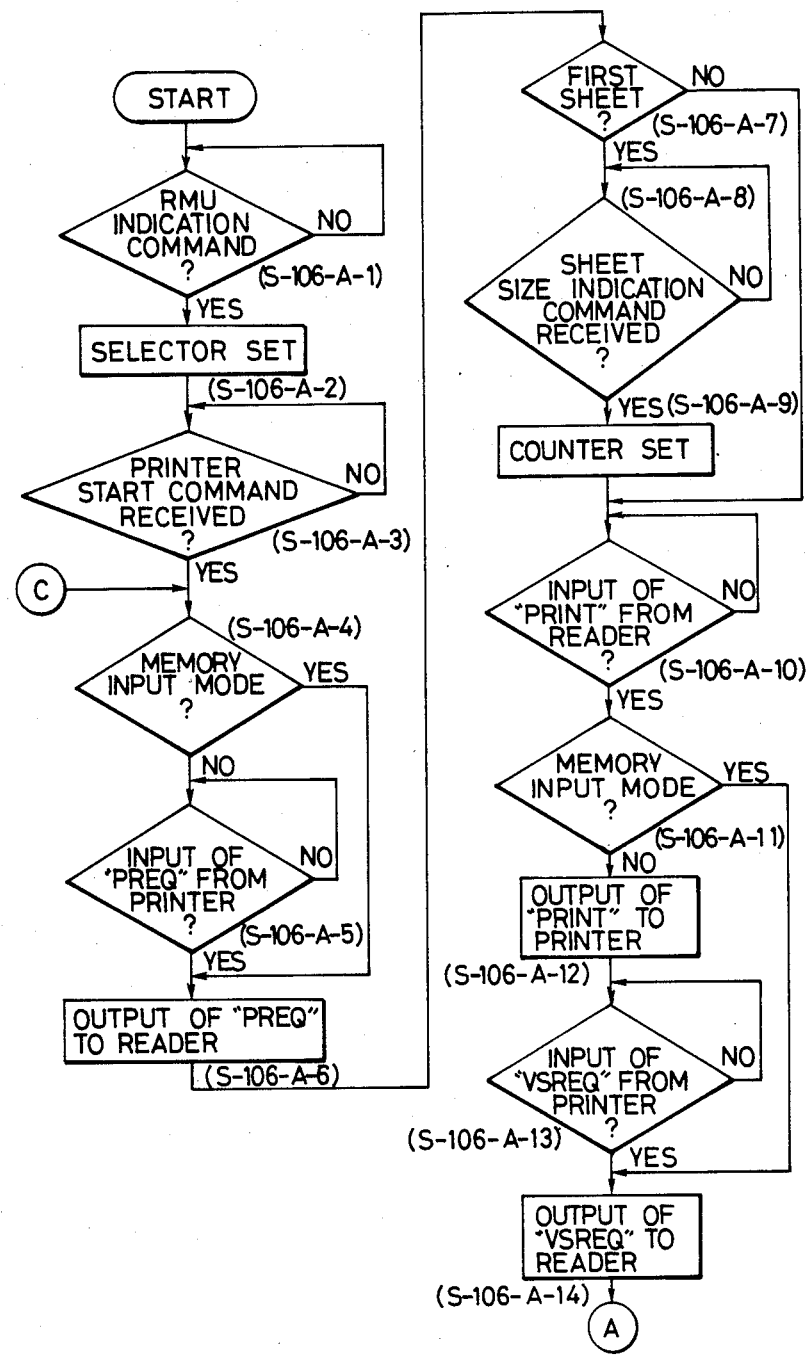
FIGS. 29 A–B to 36 are flow charts showing the procedure executed by the RMU.
Figure 29B:
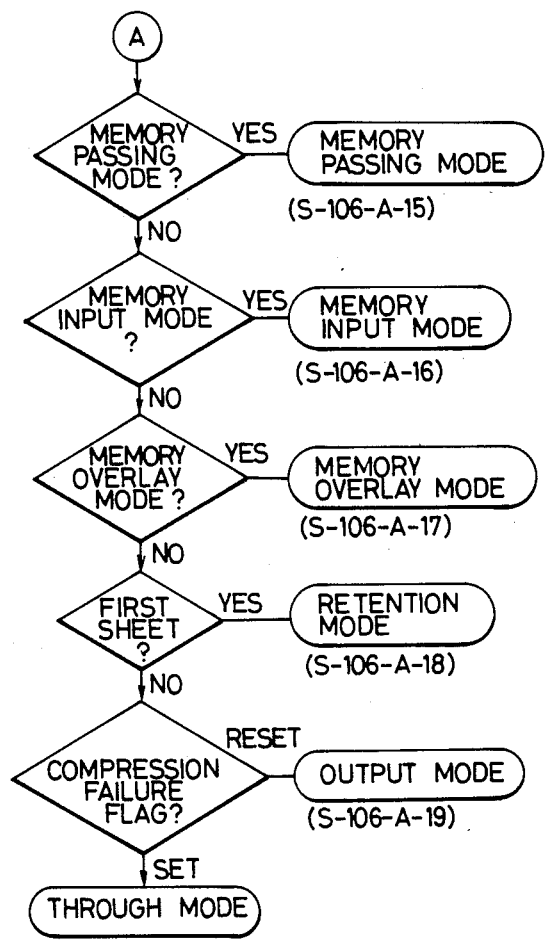

In the following there will be given an explanation on the "retention mode" of the RMU, while making reference to a flow chart shown in FIG. 29 and taking an example of trimming an A3-sized image A (cf. FIG. 13, 297 mm in main scanning direction x 420 mm in sub-scanning direction) to obtain an image B of 140 mm ×210 mm, starting from a point distanced from the edges by 70 mm in the main scanning direction and 100 mm in the sub-scanning direction. The RMU receives the RMU mode indicating command, with a second byte shown in Tab. 4, in which bits 6 and 5 are set to "1", for obtaining an output density of ca. 50% respectively in the image from the reader and the image expanded in the RMU, and bits 4, 3, 2 and 1 are set as indicated by 104-2 in Tab. 5 for designating an RMU mode. The RMU memory indicating command shown in Tab. 6 is entered to indicate the memory A. The reader designates the trimming in millimetric units, by means of the RMU trimming indicating command 1, indicating the main-scanning compression start position Hp=70 mm; the RMU trimming indicating command 2, indicating the sub-scanning compression start position Vp=100 mm; the RMU trimming indicating command 3, indicating the main-scanning compression width Hw=140 mm; and the MRU trimming indicating command 4, indicating the subscanning compression width Vw=210 mm (S-106-A-1). The controller 10-2 converts the above-mentioned positional information into the number of bits or lines, to obtain data of Hp=1102 bits, Vp=1574 lines, Hw =2204 bits and Vw=3307 lines, as shown in FIG. 13. Also according to the indicated RMU mode, the selectors SEL1 (10-18), SEL2 (10-19), SEL3 (19-20), SEL4 (19-21), SEL5 (19-22) and video selector are so set as to respectively select R-VCLK, R-VDA, R-VE, R-VE, P-DE, A0 and B0. The dither signal shown in FIG. 11 is set at the L-level for binary compression and storage of the image signals from the reader into the compressed image memory. Since the RMU is set at the "memory high-speed mode" with an interval "retention" mode, the RMU transmits the printer start command, received from the reader, to the printer (S-106-A-3). Then the RMU receives the PREQ signal indicating a print sheet ready state of the printer (S-106-A-5), and sends said signal to the reader (S-106-A-6). As a first copying process in the "memory high-speed mode) is in execution in this state (S-106-A-7), the reader releases the sheet size indicating command, indicating the size of the print sheet (S-106-A-8), which is stored in the aforementioned MA-PSZ. Then various counters are set in the following manner, according to the indicated sheet size (S-106-A-9). At first the aforementioned compressed image write start address MS and the compressed image maximum address ME are set in the memory address counter 10-8 and the comparator 10-14. In the down counter 13-1 of the dither counter shown in FIG. 1, there are set upper 10 bits 248H (584) of 1245H (4677), and, in the down counter 13-2 there are set lower 3 bits 5H (5). Similarly data 1245H (4677) are set in the down counter of the main scanning counter-decoder shown in FIG. 12. No data settings are made in the comparators 14-2, 14-3 as they are used only in the image expansion. Data DF7H (3575) corresponding to Hp and data 55BH (1371) corresponding to Hp, Hw are set respectively in the compaeators 14-4, 14-5, and data 1245H (4677) are set in the comparator 14-8 for activating the address DADR simultaneously with the HADR.

Upon receiving the RPINT signal from the reader (S-106-A-10), the RMU sends said signal to the printer (S-106-A-12). Also upon receiving the VSREQ signal from the printer (S-106-A-13), the RMU sends said signal to the reader (S-106-A-14).

Figure 30:
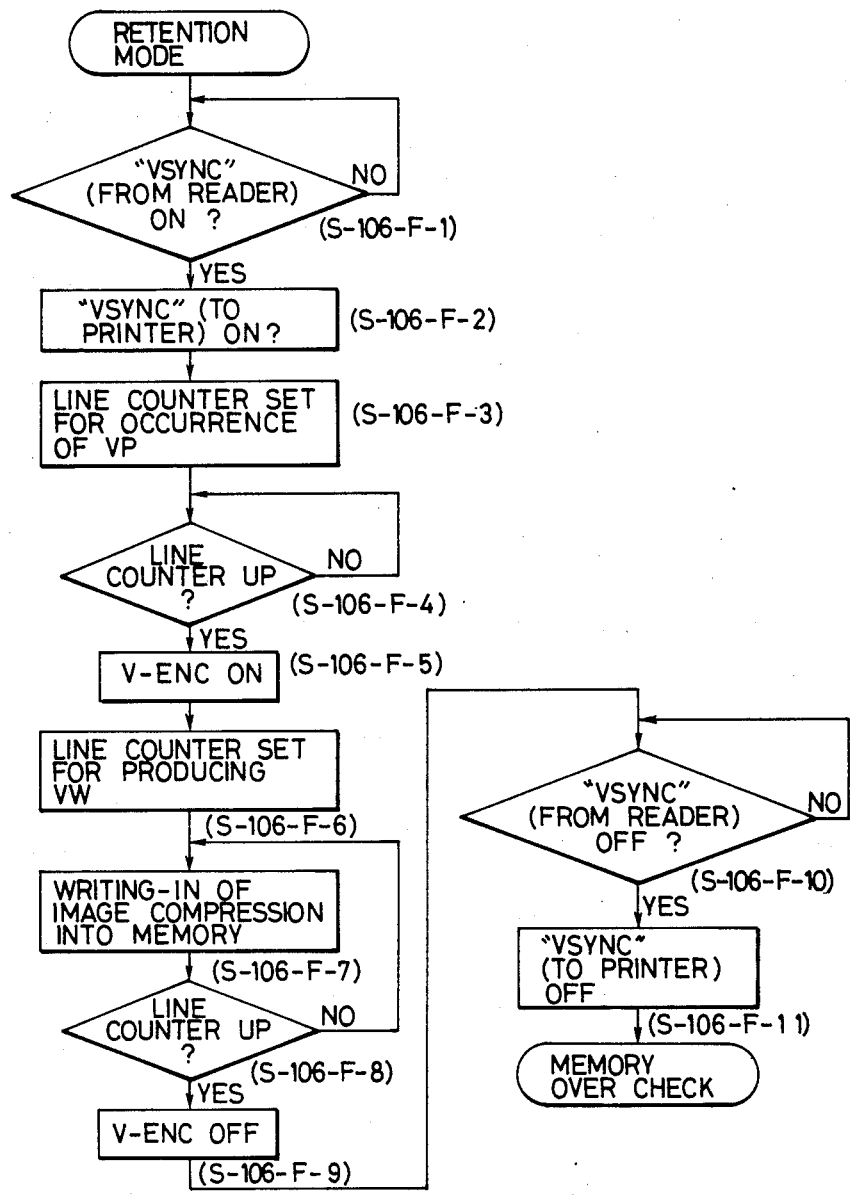

As the RMU handles the first copy in the "memory high-speed mode" in this state, the retention" internal mode is adopted (S-106-A-18). Now referring to FIG. 30, when the VSYNC signal from the reader is turned on (S-106-F-1), the RMU turns on the VSYNC signal to the printer (S-106-F-2). Data 626H (1574) are set in the line counter 10-11 for generating Vp=1574 lines, and, when the line counter completes counting (S-106-F-4), the sub-scanning compression section signal V-ENC is turned on (S-106-F-5). Then data 3307 corresponding to the sub-scanning width Vw of the area B in FIG. 13 are set in the line counter (S-106-F-6). Then the compressed image codes from the compression circuit 10-4 are stored in the compressed image memory 10-5 until the line counter 10-11 completes counting operation, while image signals from the reader are transmitted to the printer (S-106-F-7, S-106-F-8). When the completion of counting operation of the line counter 10-11, indicating the completion of image compression of a determined number of sub-scanning lines, is detected, the V-DEC signal is turned off (S-106-F-9), and, in response to the turning off of the VSYNC signal from the reader (S-106-F-10), the VSYNC signal to the printer is turned off (S-106-F-11).

Figure 31:
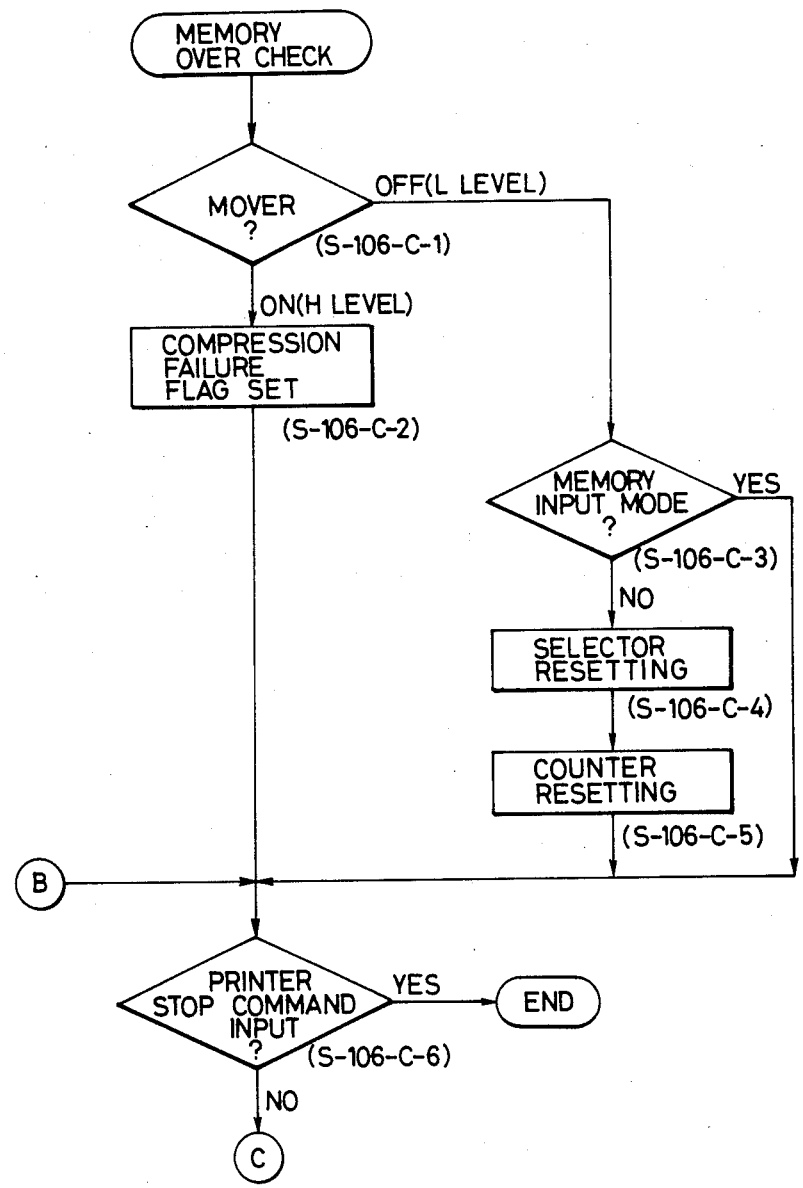
Figure 32:
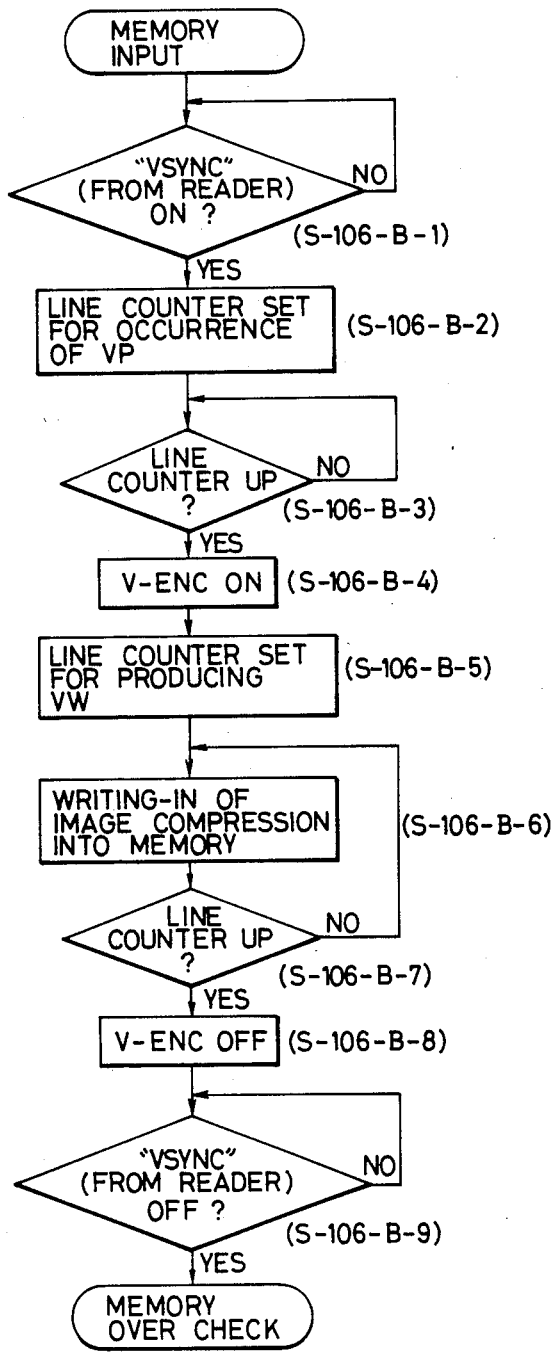

Thereafter the MRU checks the MOVER signal, in order to identify whether the signal storage into the compressed image memory has been successful or not, according to a procedure shown in FIG. 31 (S-106-C-1), then sets a compressure error flag if a failed storate into the memory is identified from the H-level state of the MOVER signal (S-106-C-2) and transmits the information on said compression error (RMU memory overflow) through the serial communication in the aforementioned copying operation to the reader. In response the reader, identifying that the retention mode utilizing the compressed image memory is unreliable, repeats the original scanning for the second and ensuing copies until the copying operation is completed. This function ensures to obtain copies of a desired number from the printer even when the image signals from the reader cannot be accommodated in the compressed image memory. The RMU designates the memory area, in which the compressed image has been stored, as an empty area, and changes the internal mode to the "throughout mode" by the compression error flag. The "throughout mode" is same as the "memory pass mode", in which the RMU does not effect image compression as the V-ENC signal is not turned on and off in response to the VSYNC signal from the reader. The selectors and counters are set as in the "retention mode", and the RMU transmits the VSYNC signal from the reader to the printer (FIG. 33; S-106-D-1, S-106-D-2), then transmits the image signals from the reader to the printer (S-106-D-3) and awaits the VSYNC signal from the reader. Upon receiving the VSYNC signal (S-106-D-4), the RMU turns off the VSYNC signal to the printer (S-106-D-5). Having released the image signals for copies of a determined number, the reader releases the printer stop command to stop the printer. In response to said printer stop command, the RMU terminates the copy sequence (S-106-D-6).

On the other hand, in case the MOVER signal is at the L-level indicating a successful storage into the memory, the RMU transmits said fact to the reader by serial communication to stop the original scanning in the second copy and thereafter, and continues the copying operation by the image expanded from the compressed image memory of the MRU. For releasing the expanded image, the selectors and counters are set again in the "output mode" as will be explained in the following (S-106-C-4, S-106-C-5). The selectors SEL1, SEL2, SEL3, SEL4, SEL5 and the video selector shown in FIG. 10 are so set as to respectively select I-CLK, DVDO, P-BD, OVE, HSYNC, A2 and B2. The content of MA-METHOD indicates that the compressed image memory stores compressed image signals obtained by binary compression. Thus, the dither signal shown in FIG. 11 is set at the L-level for binary image expansion of the compressed image signals.

The data set in the counters and comparators are obtained from the aforementioned MA-PSZ, MB-PSZ and MC-PSZ. The size of the stored image is equal to 2204×3307 corresponding to the area B shown in FIG. 13, so that data 12F4H (4852) are set in the down counter 14-1 shown in FIG. 12, as in the image expansion already explained in relation to FIGS. 17 and 21. Likewise data 1247H (4679), 2H (2), 1247H (4679), 9ABH (2475), dF9H (3577), 55dH (1373) and 1247H (4679) are respectively set in the comparators 14-2, 14-3, 14-4, 14-5, 14-6, 14-7 and 14-8, and a value 0 is set in the expansion error counter 10-35 for effecting image expansion from the compressed image memory. Also data 1H (1) and 1BFH (447) are respectively set in the down counters 13-1, 13-2 of the dither counter shown in FIG. 11 (S-106-C-5).

The reader identifies the absence of th RMU memory overflow by means of the error unit status request command, and terminates the original scanning. Since the reader does not the VSYNC signal, the RMU turns on the VSYNC signal to the printer without awaiting said signal from the reader (S-106-H-2). Then the line counter is so set to count 1574 lines corresponding to the margin Vp in the sub-scanning direction (S-106-H-3). When the line counter completes the counting operation (S-106-H-4), it turns on the V-DEC signal, sets the line counter so as to count 3307 lines corresponding to Vw (S-106-H-8) and checks the image expansion error until the line counter completes the counting operation (S-106-H-9). In the present embodiment, the expansion error flag is set to terminate the copying operation, in response to eight expansion errors. The RMU informs the reader of a fact, by serial communication, that there have been errors of a determined number (8), and, in response, the reader interrupts the copying operation by suspending the PRINT signal thereafter. The RMU terminates the image expansion by turning off the V-DEC signal, then setting a number corresponding to the sub-scanning lines $V_R$ in the line counter, and turning off the VSYNC signal to the printer after the line counter completes the counting operation. The reader sends the printer stop command to the printer, which, in response, terminates the printing operation. If the number of errors does not reach 8, the RMU repeats the image expansion by (copy number−1) times, and terminates the operation in response to the printer stop command from the reader (S-106-C-6).

Figure 33:
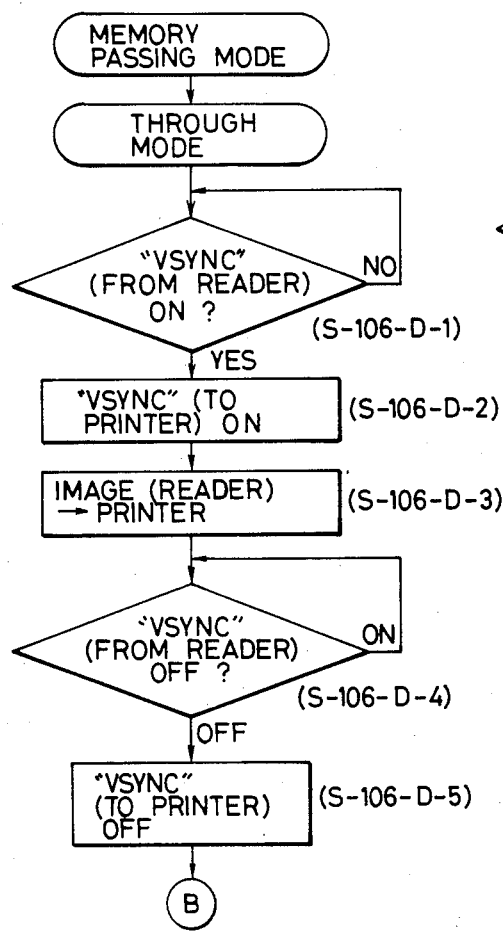

Now reference is made to FIG. 33 for explaining the memory pass mode, in which two video signals RVDA, RVDB from the reader, representing three levels, are directly transmitted to the printer without storage in the memory. In said mode the selector 10-23 selects A1 and B1 shown in FIG. 10. Also the selector 10-18 selects the R-VCLK signal from the reader as $\phi_{sys}$, and the selector 10-22 selects the P-BD signal from the printer as the HSYNC signal (S-106-A-2).

Thereafter the control signals from the reader are transmitted to the printer, and those from the printer are transmitted to the reader as if the RMU is not present. When the VSYNC signal from the reader is turned on (S-106-D-1), the RMU turns on the VSYNC signal to the printer, and transmits the image signals from the reader to the printer through the selector 10-23 (S-106-D-2, S-106-D-3). When the VSYNC signal from the reader is turned off (S-106-D-4), the RMU turns off the VSYNC signal to the printer (S-106-D-5), and terminates the printing operation in response to the printer stop command. On the other hand, in the absence of the printer stop command, the above-explained procedure is repeated for a predetermined number of times.

In the following there will be explained a case in which an image stored in the compressed image memory in the "memory input mode" is synthesized with an image from the reader in the "memory overlay mode" and supplied to the printer.

As a first step for such memory overlay, image information has to be stored in the memory, and this is achieved by the "memory input mode" of the RMU. The instructions to the RMU in case of storing the trimmed area B, shown in FIG. 13, into the memory area C with compression are entered from the reader by the second byte of the RMU mode indicating command shown in Tab. 20, the second byte of the RMU memory indicating command shown in Tab. 21, and the trimming data of the RMU trimming indicating commands 1-6 as shown in Tab. 24, corresponding to trimming data entered by the operator through the operation unit of the reader. In said "memory input mode", the printer start command 100-2 shown in Tab. 1 needs not be supplied to the printer since the printer does not perform the printing operation. Consequently the selectors SEL1, SEL2, SEL3, SEL4, SEL5 and the video selector shown in FIG. 10 are so set as to respectively select R-CLK, R-VDA, R-VE, R-VE, HSYNC, A0 and B0 (S-106-A-2). Also the printer does not supply the PREQ signal to the RMU because of the absence of the printing operation, and the RMU sends, instead of the printer, the PREQ signal to the reader (S-106-A-4, A-106-A-6).

Upon receiving the sheet size indicating command, the RMU stores the sheet size in MC-PSZ, for the sheet of the memory C, in the control unit, and aos stores the binary state of the image in the MC-METHOD.

According to the sheet size and the trimming data Hp (main-scanning reference position), Vp (sub-scanning reference position), Hw (main scanning width), Vw (sub-scanning width), $H_M$ (movement in main scanning direction) and $V_M$ (movement in the subscanning direction) entered from the reader, a value 4677 is set in the down counter 14-1, a value Hp=3575 in the comparator 14-4, a value Hw=1371 in the comparator 14-5, a value 4677 corresponding to the sheet size in the comparator 14-8, and a value 4677 in the dither counter 14-1. Also the aforementioned image write start address MS is set in the memory address counter 10-8, and the maximum write address ME is set in the comparator 10-14 (S-106-A-9).

Upon receiving the PRINT signal from the reader (S-106-A-10), the RMU does not transmit said signal to the printer but sends the VSREQ signal, instead of the printer, to the reader (S-106-A-11, S-106-A-14). Then, upon receiving the VSYNC signal from the reader (S-106-B-1), the RMU sets a value Vp in the line counter 10-11, in order to avoid image compression in said Vp lines (1574 lines in this case) in front of the area B shown in FIG. 17 (S-106-B-2). Upon detecting the completion of the counting operation of the line counter (S-106-B-3), the RMU turns on the V-ENC signal to initiate the image compression (S-106-B-4), then sets the width of image compression (3307 in this case) in the line counter (S-106-B-5) and repeats the image compression until the line counter completes the counting operation (S-106-B-6, S-106-B-7). Upon detecting the completion of the counting operation of the line counter, the RMU turns off the V-ENC signal to terminate the image compression (S-106-B-8). Then, upon detecting the turning off of the VSYNC signal from the reader (S-106-B-9), the RMU checks the MOVER signal for detecting the RMU memory overflow (FIG. 31; S-106-C-1).

If the MOVER signal is at the H-level, indicating a failed storage into the memory, the RMU sets the compression error flag to transmit the information of compression error to the reader (S-106-C-2) whereby said information is added to the error unit status code, by means of which the reader recognizes the compression error. Also in case of a compression error, the information of the MC-PSZ (sheet size for the memory C), MC-METHOD (reading mode), MCS (memory C start address), MCE (memory C end address) and MC-VIDEO (compression mode) are set as if no information is recorded in the memory C. In this manner the memory area selected at said compression error is regarded as an empty area and can be effectively utilized in the next compressing operation. On the other hand, in a successful compression, necessary information is recorded in the MCS, MCE, MC-METHOD, MC-VIDEO and MC-PSZ for utilization at the image expansion from the memory area C. Upon receiving the printer stop command from the reader (S-106-C-6), the RMU terminates the sequence.

Now, let us consider a case in which signals of an A4-sized image are compressed and stored for example in the memory B through the above-explained "memory input mode", and said signals are expanded in the "memory overlay mode" and overlaid with the signals from the reader for supply to the printer. The expanded image from the compressed image memory of the RMU is supplied to the printer with a density of ca. 50%, by setting "0" in the bit 5 in the second byte of the RMU mode indicating command. Also in order to trim the expanded image into an image area of Hw bits in the main scanning direction and Vw bits in the subscanning direction, starting from a reference point distanced from the edges by Hp bits in the main scanning direction and Vp bits in the sub-scanning direction, the reader sends the RMU mode indicating command; the RMU memory indicating command; the RMU trimming indicating commands 1 to 6 in which the values Hp, Vp, Hw, Vw, $H_M$ and $V_M$ are set in the units of bits or lines in the trimming data 1 to 6. In response the RMU sets the selectors SEL1, SEL2, SEL3, SEL4, SEL5 and the video selector to respectively select the R-VCLK, DVDO, LN-ST, R-VE, P-BD, A3 and B3, and sets the dither signal to the L-level.

Figure 34:
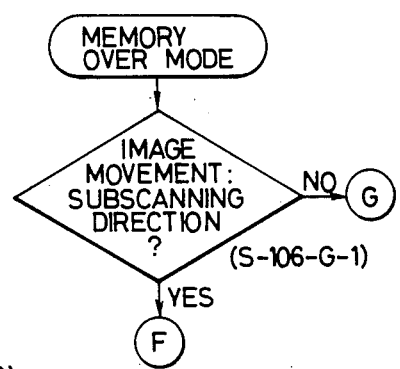
Figure 35:
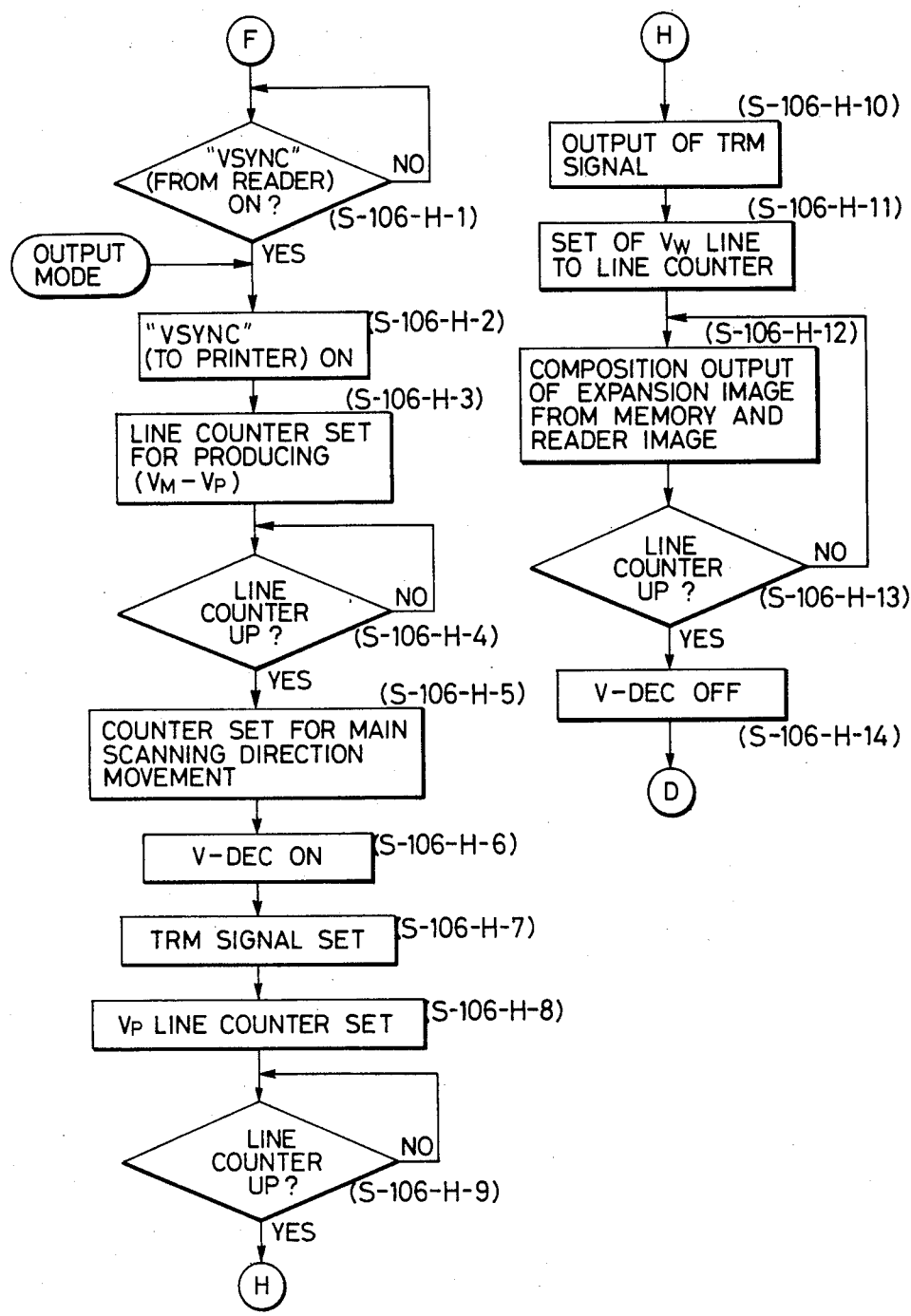

In a flow chart shown in FIG. 34, there is identified the moving direction of the expanded image T in the sub-scanning direction (S-106-G-1). If the image T is moved in a direction same as that of sub-scanning, the program proceeds to a flow chart shown in FIG. 35.

The sheet size indicating command received from the reader is stored separately from the sheet size of the compressed image. The procedures for the signals PREQ, PRINT and VSREQ are same as in the "memory pass mode" or "throughout mode". Following values of Hp, Vp, Hw, Vw, $H_M$ and $V_M$, in bits or lines, calculated from the stored sheet size and trimming data, are set in the following manner: 4677 in the comparator 14-4, 0 in the comparator 14-5, 4677 in the comparator 14-8, 4677 $-(Hp-H_M)$ in the down counters 13-1, 13-2, and 4677 in the counter 14-1. In case the image is moved in a direction same as that of subscanning, upon receiving the VSYNC signal from the reader (S-106-H-1), the RMU turns on the VSYNC signal to the printer (S-106-H-2) and sets the line counter to shift the V-DEC signal with a delay of $(V_M-V_P)$ lines from the VSYNC signal to the printer (S-106-H-3). Then, when the line counter completes the counting operation (S-106-H-4), the RMU sets 1FFFH in the comparator 14-6 and 4677 in the comparator 14-7 in order to maintain the TRM signal at the L-level during Vp sub-scanning lines. It also sets 4677 and 4677$-(H_M-H_P)$ respectively in the HADR and DADR (S-106-H-5), turns on the V-DEC signal (S-106-H-6), sets the TRM signal for image trimming (S-106-H-7) and sets the line counter for Vp lines (S-106-H-8). After the end of counting operation of said line counter (S-106-H-9), the RMU sets the TRM signal for image expansion (S-106-H-10), sets the line counter for Vw lines (S-106-H-11), synthesizes the expanded image with the image from the reader for Vw lines (S-106-H-12), and turns off the V-DEC signal for terminating the image expansion (S-106-H-14).

Figure 36:
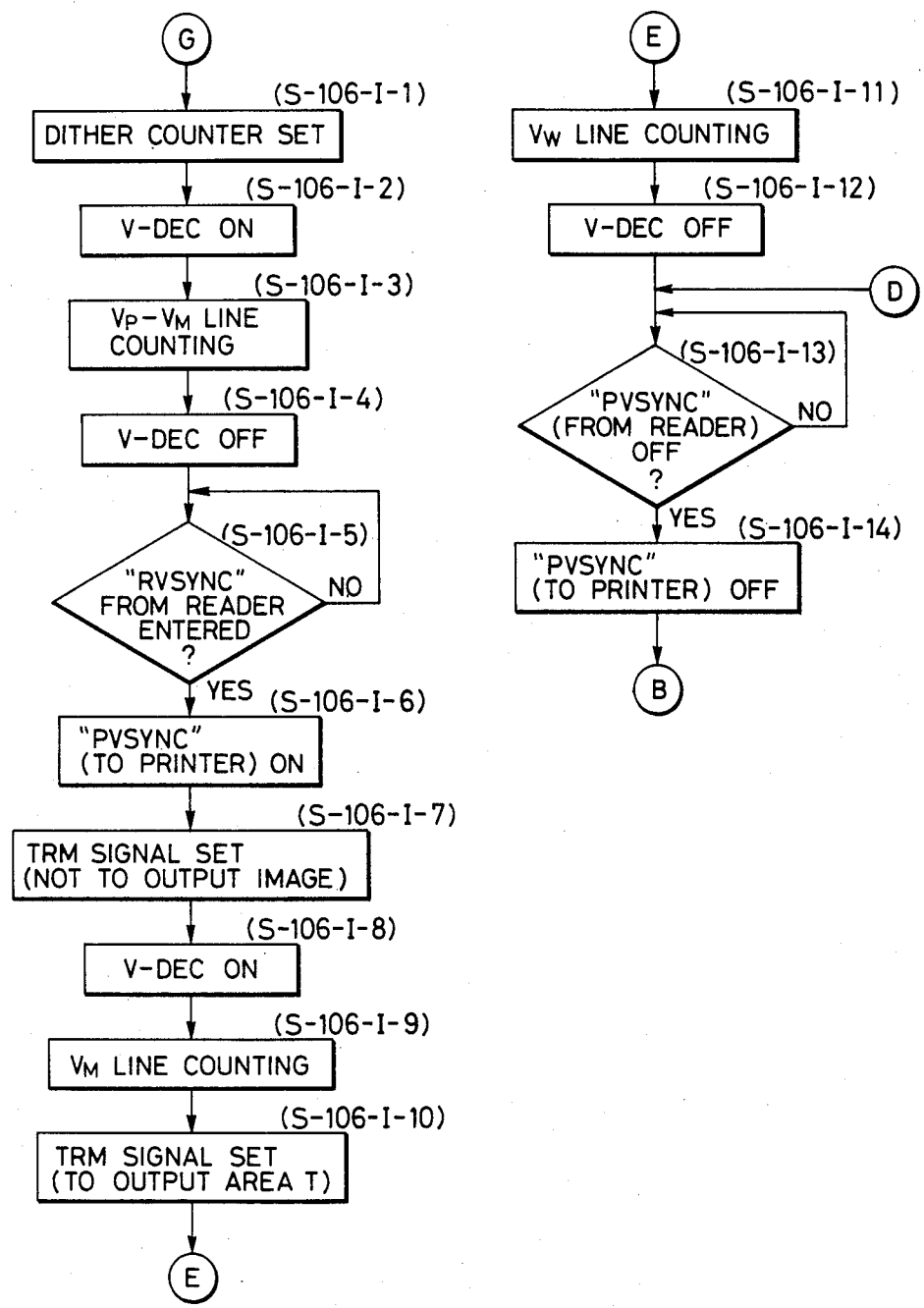

On the other hand, in case the expanded image T is moved in a direction opposite to the direction of sub-scanning, the program proceeds, from the step S-106-G-1 in FIG. 34, to a flow shown in FIG. 36. In the following there will be explained the control procedure of the controller 10-2, in case of trimming an A4-sized image, expanded from the compressed image memory to obtain an area T having, as shown in FIG. 22(c), a sub-scanning image position V1=Vp and a sub-scanning image width V2=Vw, and moving said area T to a position V3=$V_M$, wherein V3 is the distance from the start point of sub-scanning to the point t1, with synthesis of an image from the reader.

In this case it is assumed that the area T has a main-scanning image position H1=Hp and a main scanning image width H2=Hw, and is moved in the main-scanning direction to a position H3=$H_M$, wherein H3 is the distance from the start position of main scanning to the point t1. Then, according to FIG. 22, a value 4677 is set in the counter 14-1 as HADR. Also a value 4677 is set in the comparator 14-4 for generating the HAREA signal, 0 in the comparator 14-5, 4677 in the comparator 14-8 for activating the dither counter, and 4677$-(H_M-H_p)$ in the counters 13-1, 13-2 (S-106-J-1). Then the selector SEL1 (10-18) is so set to select the ICLK signal as the $\phi_{sys}$ signal, while the start address of the compressed data of the image U is set in the memory address counter 10-8, and the V-DEC signal is turned on to initiate the expansion of the image U. Then the sub-scanning lines of a number $Vp-V_M$ are counted by the line counter 10-11, corresponding to the overflowing length of the image U from the print sheet (S-106-I-3), and the V-DEC signal is turned off to interrupt the image expansion (S-106-I-4).

Then the selector SEL1 (10-18) is so set as to select the RVCK signal as the $\phi_{sys}$ signal, in order to effect the image expansion thereafter in synchronization with the VSYNC (PVSYNC) signal of the reader. In this manner an exact registration can be attained between the image U and the image from the reader to be synthesized. Upon detecting the VSYNC signal from the reader, the controller 10-2 sends the sheet feed signal PVSYNC to the printer (S-106-I-6), and shift the TRM singal to the L-level to prohibit the output of the expanded image signals during a period of $V_M$ sub-scanning lines.

This is achieved by setting 1FFFH in the comparator 14-6 and 4677 in the comparator 14-7 (S-106-I-7). Then, the V-DEC signal is turned on again to re-start the image expansion without a change in the set value of the memory address counter 10-8. Then the line counter 10-11 counts the $V_M$ lines before the image signals T are released (S-106-I-9).

Then the comparators for generating the TRM signal are set to form the area T by trimming. According to FIG. 22(c), a value 4677$-H_M$ is set in the comparator 14-6, and a value 4677$-(Hw+H_M)$ is set in the comparator 14-7 (S-106-I-10).

In this manner the output of the area T starts at a position t1 shown in FIG. 22(c).

Then the controller 10-2 detects the completion of output of the image signals of the area T, by counting the Vw lines corresponding to the sub-scanning width of the area T with the line counter 10-11 (S-106-I-11), and turns off the V-DEC signal to terminate the image expansion (S-106-I-12).

Having completed the expansion and output of the compressed image signals in this manner, the controller 10-2 awaits the completion of image output from the reader 10-1 to the printer 10-3 (S-106-I-13). Upon detecting the end of the PVSYNC signal from the reader, the controller 10-2 turns off the VSYNC (PVSYNC) signal to the printer 10-3, thus terminating the output of an image thereto (S-106-I-14), and proceeds to a step S-106-C-6 shown in FIG. 31 for checking whether copying operations for a preselected number of copies are completed.

The RMU functions according to the selection of four modes as explained above.

In the present embodiment, the run-length encoded image signals are stored in such state, but further compression such as MH or MR may also be applied to such run-length codes. Also the image signals to be compressed may be transmitted for example through a telephone line.

Also the capacity of the memory means is not necessarily limited to three images, and said memory means may receive compressed image signals for example through a telephone line.

Also the number of errors in the image expansion, employed for the decision for interruption of image expansion or output is naturally not limited to 8. Again the compressed image signals may be those transmitted for example through a telephone line.

The image memory means may also be composed of an optical or magnetic disk.

Furthermore, the image signals may have a number of levels other than two or three.

Also the image area may be defined by numeral keys or a cursor in the reader, or designated by a memory storing predetermined area data.

The image synthesis is not limited to a superposition of image but includes insertion of a second image into a determined portion of a first image, and combination of desired portions only of plural images.

In the foregoing embodiment there has been explained a synthesis of image signals obtained by an original reading with image signals stored in memory means, but the combination of image signals to be synthesized is not limited to such case. There may also be employed a combination of plural image signals simultaneously entered from plural image reading units, or a combination of plural stored image signals, or a combination an image signal transmitted through a telephone line and an image signal from another input unit. Also the synthesis may include not only two images but also more images.

The foregoing structure not only enables efficient compression and storage of dither-processed image signals, but also provides a compression process corresponding to the image size, through a precompression process conducted according to the size of input image information.

Also said structure enables effective storage of plural compressed image signals in the memory means, minimizing the signal overflow and image signal destruction in the memory means.

Also said structure replaces, in case of an error in the expansion of compressed image signal, a line including said error with a normal line, thereby avoiding a distortion in the reproduced image and enabling satisfactory image formation.

Also said structure prohibits the output of image signal until the compressed image signal is properly expanded, thus avoiding the output of image signals involving errors in the image expansion, thus avoiding a distortion in the image formation.

Also said structure is capable, in case of an error in the expansion of compressed image signal, of rapidly detecting a line synchronization signal employed as a reference for image expansion, thereby enabling a prompt recovery of an error in the image expansion.

Also said structure is capable of preventing a distortion in the image by providing a normal image signal instead in case of an abnormality in the expanding operation of the compressed image signal, and terminating the image signal expansion or output in case such abnormality is frequently repeated, thereby enabling a prompt recovery of such abnormality.

Also said structure, in case of expansion and output of a stored compressed image, controls the image expanding operation according to the amount of signal readout from the memory means and the number of expanded output lines, thereby enabling secure expansion of desired information in the compressed image and avoiding other inconveniences such as the destruction of other stored compressed images.

Also said structure allows to avoid the difference in density, between an image formed from the image signal stored in the memory means, and an image formed from non-stored image signal.

Also said structure, in case of extracting a part of the image represented by the compressed image signal, does not expand the image signal not corresponding to said part, thus enabling to reduce the time required for the expanding operation and to avoid errors resulting from such unnecessary image expansion.

Also said structure compresses the image signal representing a necessary image only, thereby avoiding unnecessary compressing operation and reducing the probability of compression errors, thus achieving more efficient compression.

Also said structure is capable of expanding the compressed and stored image signal in synchronization with image signal to be synthesized, thereby enabling such synthesis of images in accurate manner.

Also said structure is capable of independently regulating the densities of plural image signals of respectively different image densities, thereby allowing to obtain a desired image with arbitrary image densities.

TABLE 1

| | | Execution commands | | |
|---|---|---|---|---|
| | Command | 1st byte code | 2nd byte code | 3rd byte code |
| 100-1 | Printer start command | 8CH | | |
| 100-2 | Printer stop command | 4AH | | |
| 100-3 | Lower cassette sheet feed command | 51H | | |
| 100-4 | Upper cassette sheet feed command | 52H | | |
| 100-5 | Sheet size indicating command | 80H | sheet size | |
| 100-6 | Sheet number indicating command | 85H | sheet number | |
| 100-7 | RMU mode indicating command | 89H | mode | |
| 100-8 | RMU memory indicating command | 8AH | memory | |
| 100-9 | RMU trim indicating command 1 | 91H | trim data | trim data |
| 100-10 | RMU trim indicating command 2 | 92H | trim data | trim data |
| 100-11 | RMU trim indicating command 3 | 98H | trim data | trim data |
| 100-12 | RMU trim indicating command 4 | 9BH | trim data | trim data |
| 100-13 | RMU trim indicating command 5 | 9DH | trim data | trim data |
| 100-14 | RMU trim indicating command 6 | 9EH | trim data | trim data |

TABLE 2

| Sheet size indicating command | |
|---|---|
| Bit | Content |
| 7 | 0 |
| 6 | Sheet size |
| 5 | Sheet size |
| 4 | Sheet size |
| 3 | Sheet size |
| 2 | Sheet size |
| 1 | Sheet size |
| 0 | Parity bit |

TABLE 3

| Sheet number indicating command | |
|---|---|
| Bit | Content |
| 7 | 0 |

TABLE 3-continued

| Sheet number indicating command | |
|---|---|
| Bit | Content |
| 6 | Sheet number |
| 5 | Sheet number |
| 4 | Sheet number |
| 3 | Sheet number |
| 2 | Sheet number |
| 1 | Sheet number |
| 0 | Parity bit |

TABLE 4

| RMU mode indicating command | |
|---|---|
| 7 | 0 |
| 6 | R-HALF |
| 5 | RMU-HALF |
| 4 | Dither |
| 3 | Mode |
| 2 | Mode (See Tab. 5) |
| 1 | Mode |
| 0 | Parity bit |

TABLE 5

| | Bit 4 | Bit 3 | Bit 2 | Bit 1 | RMU mode indicating command Dither mode |
|---|---|---|---|---|---|
| 104-1 | 0 | 0 | 0 | 0 | Line memory pass mode |
| 104-2 | 0 | 0 | 0 | 1 | Line memory high-speed mode |
| 104-3 | 0 | 0 | 1 | 0 | Line memory input mode |
| 104-4 | 0 | 0 | 1 | 1 | Line memory overlay mode |
| 104-5 | 1 | 0 | 0 | 0 | Dither memory pass mode |
| 104-6 | 1 | 0 | 0 | 1 | Dither memory high-speed mode |
| 104-7 | 1 | 0 | 1 | 0 | Dither memory input mode |
| 104-8 | 1 | 0 | 1 | 1 | Dither memory overlay mode |

TABLE 6

| RMU memory indicating command | |
|---|---|
| Bit | Content |
| 7 | 0 |
| 6 | — |
| 5 | — |
| 4 | — |
| 3 | Memory C |
| 2 | Memory B |
| 1 | Memory A |
| 0 | Parity bit |

What we claim is:

1. An image signal processing system comprising:
memory means for storing compressed image signals representing a frame of image;
expansion means for sequentially expanding the compressed image signals read from said memory means; and
extraction means for extracting image signals representing a part of image in a frame of image from the image signals expanded by said expansion means,
wherein the expanding operation performed by said expansion means is terminated when the expansion of the image signals to be extracted by said extraction means is completed.

2. An image signal processing system according to claim 1, wherein said memory means is adapted to store the compressed image signals representing plural frames of image.

3. An image signal processing system according to claim 1, further comprising means for generating an extraction signal indicating a part of image of a frame of image, wherein said extraction means is adapted to extract the image signals in accordance with said extraction signal.

4. An image signal processing system according to claim 3, wherein said expansion means is adapted to terminate the expanding operation in accordance with termination of generation of said extraction signal.

5. An image signal processing system according to claim 1, further comprising forming means for image formation according to the image signals extracted by said extraction means.

6. An image signal processing system according to claim 1, further comprising reading means for photoelectrically reading an original image, and means for compressing the image signals from said reading means, wherein said memory means is adapted to store the image signals compressed by said compression means.

7. An image signal processing system comprising:
memory means for storing compressed image signals representing a frame of image;
expansion means for sequentially expanding the compressed image signals read out from said memory means; and
forming means for forming an image on a recording sheet based on the image signals expanded by said expansion means, wherein compressed image signals, corresponding to an image on a portion which is not formed on the recording sheet by said forming means, are read out from said memory means, prior to the start of image formation by said forming means.

8. An image signal processing system according to claim 7, wherein said memory means is adapted to store the compressed image signals of at least an image.

9. An image signal processing system according to claim 7, further comprising means for generating an extraction signal indicating a part of image in a frame of image, and for extracting the image signals in accordance with said extraction signal.

10. An image signal processing system according to claim 7, further comprising means for photoelectrically reading an original image and means for compressing the image signals from said reading means, wherein said memory means is adapted to store the image the image signals compressed by said compression means.

11. An image signal processing system comprising:
input means for entering image signals;
definition means for defining a part of image in a frame of image represented by the image signals entered from said input means;
compression means for compressing the image signals entered from said input means; and
memory means for storing the image signals compressed by said compression means,
wherein said compression means is adapted to compress the image signals defined by said definition means in the image signals entered from said input means.

12. An image signal processing system according to claim 11, wherein said input means comprises means for photoelectrically reading an original image and generating the image signals.

13. An image signal processing system according to claim 11, further comprising means for expanding the compressed image signals read from said memory means.

14. An image signal processing system comprising:
memory means for storing compressed image signals representing a frame of first image;

expansion means for expanding the compressed image signals read from said memory means;

input means for entering image signals representing a frame of second image; and synthesis means for synthesizing the image signals from said expansion means with the image signals from said input means to generate image signals representing a composite image of the first and second images, wherein said expansion means effects the expanding operation in synchronization with the entry of the image signals from said input means.

15. An image signal processing system according to claim 14, wherein said memory means is adapted to store the compressed image signals representing plural frames of image.

16. An image signal processing system according to claim 14, wherein said input means comprises means for photoelectrically reading an original image and generating the image signals.

17. An image signal processing system according to claim 14, Wherein said memory means is adapted to store the image signals in compressed form entered from said input means.

18. An image signal processing system comprising:

memory means for storing compressed image signals representing a frame of first image;

expansion means for expanding the compressed image signals read from said memory means;

input means for entering image signals representing a frame of second image;

synthesis means for synthesizing the image signals from said expansion means with the image signals from said input means to generate image signals representing a composite image of the first and second images; and forming means for forming the composite image of the first and second images in accordance with the image signals synthesized by said synthesis means, wherein the entry operation of the image signals by said input means and the expanding operation of said expansion means are effected in synchronization with the image forming operation of said forming means.

19. An image signal processing system according to claim 18, wherein said memory means is adapted to store the compressed image signals representing plural frames of image.

20. An image signal processing system according to claim 18, wherein said input means comprises means for photoelectrically reading an original image and generating the image signals.

21. An image signal processing system according to claim 18, wherein said forming means is adapted to form an image line by line, and to generate a synchronization signal synchronized with said image formation of each line.

* * * * *

UNITED STATES PATENT AND TRADEMARK OFFICE
CERTIFICATE OF CORRECTION

PATENT NO. : 4,814,898
DATED : March 21, 1989
INVENTOR(S) : SHINOBU ARIMOTO, ET AL.   Page 1 of 4

It is certified that error appears in the above-identified patent and that said Letters Patent is hereby corrected as shown below:

IN [56] REFERENCES CITED

U.S. PATENT DOCUMENTS, "El-Sherbimi" should read --El-Sherbini--.

IN [57] ABSTRACT

Line 1, "processing system" (second occurrence) should be deleted.

COLUMN 2

Line 39, "MRU;" should read --RMU;--.

COLUMN 3

Line 22, "reader 101" should read --reader 1-1--.
Line 62, "DDB=0." should read --VDB=0.--.

COLUMN 6

Line 14, "while signals" should read --white signals--.

COLUMN 9

Line 2, "R-HALF signal" should read --$\overline{\text{R-HALF}}$ signal--.

UNITED STATES PATENT AND TRADEMARK OFFICE
CERTIFICATE OF CORRECTION

PATENT NO. : 4,814,898
DATED : March 21, 1989
INVENTOR(S) : SHINOBU ARIMOTO, ET AL.

It is certified that error appears in the above-identified patent and that said Letters Patent is hereby corrected as shown below:

COLUMN 10

Line 22, "297" should read --297mm--.
Line 68, "22-4 bits," should read --2204 bits,--.

COLUMN 11

Line 14, "addresses DARD, HADR" should read --addresses DADR, HADR--.
Line 45, "210" should read --210mm--.

COLUMN 17

Line 38, "rom" should read --from--.

COLUMN 21

Line 18, "RVSNYC signal" should read --RVSYNC signal--.
Line 39, "addresses ADAR" should read --addresses DADR--.

COLUMN 22

Line 59, "failure flat," should read --failure flag,--.

COLUMN 24

Line 22, "execution as." should read --execution.--.
Line 63, "(B-(88)" should read --(B-(8))--.

UNITED STATES PATENT AND TRADEMARK OFFICE
CERTIFICATE OF CORRECTION

PATENT NO. : 4,814,898
DATED : March 21, 1989
INVENTOR(S) : SHINOBU ARIMOTO, ET AL.

It is certified that error appears in the above-identified patent and that said Letters Patent is hereby corrected as shown below:

COLUMN 26

Line 36, "MRU (S-1-3-21)" should read --RMU(S-103-21)--.

COLUMN 27

Line 34, "ME-" should read --ME=--.

COLUMN 28

Line 30, "MRU" should read --RMU--.
    Line 38, "SEL3 (19-20), SEL4 (19-21), SEL5 (19-22)" should read --SEL3 (10-20), SEL4 (10-21), SEL5 (10-22)--.

COLUMN 29

Line 5, "RPINT signal" should read --PRINT signal--.
    Line 34, "MRU" should read --RMU--.

COLUMN 30

Line 9, "MRU" should read --RMU--.

COLUMN 38

Line 37, "and for" should read --and extraction means for--.
    Line 43, "the image" (second occurrence) should be deleted.

UNITED STATES PATENT AND TRADEMARK OFFICE
CERTIFICATE OF CORRECTION

PATENT NO. : 4,814,898

DATED : March 21, 1989

INVENTOR(S) : SHINOBU ARIMOTO, ET AL.

It is certified that error appears in the above-identified patent and that said Letters Patent is hereby corrected as shown below:

COLUMN 39

Line 22, "Wherein" should read --wherein--.

Signed and Sealed this

Sixth Day of March, 1990

Attest:

JEFFREY M. SAMUELS

Attesting Officer

Acting Commissioner of Patents and Trademarks